United States Patent
Suzuki et al.

(10) Patent No.: US 10,726,569 B2
(45) Date of Patent: Jul. 28, 2020

(54) INFORMATION PROCESSING APPARATUS, INFORMATION PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Tatsuya Suzuki, Tokyo (JP); Akihiro Katayama, Tokyo (JP); Masakazu Fujiki, Kawasaki (JP); Masahiro Suzuki, Kawasaki (JP); Toshihiro Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 154 days.

(21) Appl. No.: 15/976,302

(22) Filed: May 10, 2018

(65) Prior Publication Data
US 2018/0336691 A1    Nov. 22, 2018

(30) Foreign Application Priority Data

May 16, 2017    (JP) .................................. 2017-097514
Apr. 19, 2018   (JP) .................................. 2018-080820

(51) Int. Cl.
*G06T 7/00*    (2017.01)
*G06T 7/586*   (2017.01)
(Continued)

(52) U.S. Cl.
CPC .............. *G06T 7/586* (2017.01); *G01B 11/25* (2013.01); *G01B 11/2513* (2013.01);
(Continued)

(58) Field of Classification Search
CPC ........... G06T 7/586; G06T 7/521; G06T 7/97; G01B 11/25; G01B 11/2513;
(Continued)

(56) References Cited

U.S. PATENT DOCUMENTS

2016/0260217 A1*  9/2016  Kitamura ........... G01B 11/2513
2016/0266255 A1*  9/2016  Nishikawa .............. G01S 17/42
(Continued)

FOREIGN PATENT DOCUMENTS

JP    H03289505 A    12/1991

OTHER PUBLICATIONS

Tsai "A Versatile Camera Calibration Technique for High-Accuracy 3D Machine Vision Metrology Using Off-the-Shelf TV Cameras and Lenses" IEEE Journal of Robotics and Automation, Aug. 1987: 323-344, vol. RA-3, No. 4.
(Continued)

*Primary Examiner* — Ping Y Hsieh
(74) *Attorney, Agent, or Firm* — Rossi, Kimms & McDowell LLP

(57) ABSTRACT

Whether to correct unevenness of brightness of a first image of an object onto which pattern light for three-dimensional shape measurement is projected is determined based on the first image or a second image of the object onto which the pattern light is not projected. If correction is performed, the three-dimensional shape of the object is measured using a corrected image obtained by correcting the unevenness of the brightness of the first image based on the second image; otherwise, the three-dimensional shape of the object is measured using the first image.

12 Claims, 12 Drawing Sheets

(51) Int. Cl.
  *G01B 11/25* (2006.01)
  *H04N 5/235* (2006.01)
  *G01B 21/04* (2006.01)
  *H04N 5/225* (2006.01)
  *G06T 7/521* (2017.01)

(52) U.S. Cl.
  CPC ............ *G01B 21/045* (2013.01); *G06T 7/521* (2017.01); *G06T 7/97* (2017.01); *H04N 5/2256* (2013.01); *H04N 5/235* (2013.01); *H04N 5/2351* (2013.01)

(58) Field of Classification Search
  CPC .... G01B 21/045; H04N 5/2256; H04N 5/235; H04N 5/2351
  See application file for complete search history.

(56) References Cited

U.S. PATENT DOCUMENTS

| | | | |
|---|---|---|---|
| 2017/0008169 A1* | 1/2017 | Kitamura | G06K 9/00201 |
| 2017/0309035 A1* | 10/2017 | Koda | G06T 7/586 |
| 2017/0311012 A1* | 10/2017 | Griffiths | H04N 5/2351 |
| 2018/0195858 A1* | 7/2018 | Nishikawa | G01B 21/045 |

OTHER PUBLICATIONS

Naidu et al. "A Comparative Analysis of Algorithms for Determining the Peak Position of a Stripe to Sub-pixel Accuracy" British Machine Vision Conference, 1991: 217-225.

Rother et al. "GrabCut"—Interactive Foreground Extraction using Iterated Graph Cuts. 2004: 309-314.

Tateno et al. "A Model Fitting Method using Intensity and Range Images for Bin-Picking Applications." 2010: OS5-1 714-721. English Abstract provided.

* cited by examiner

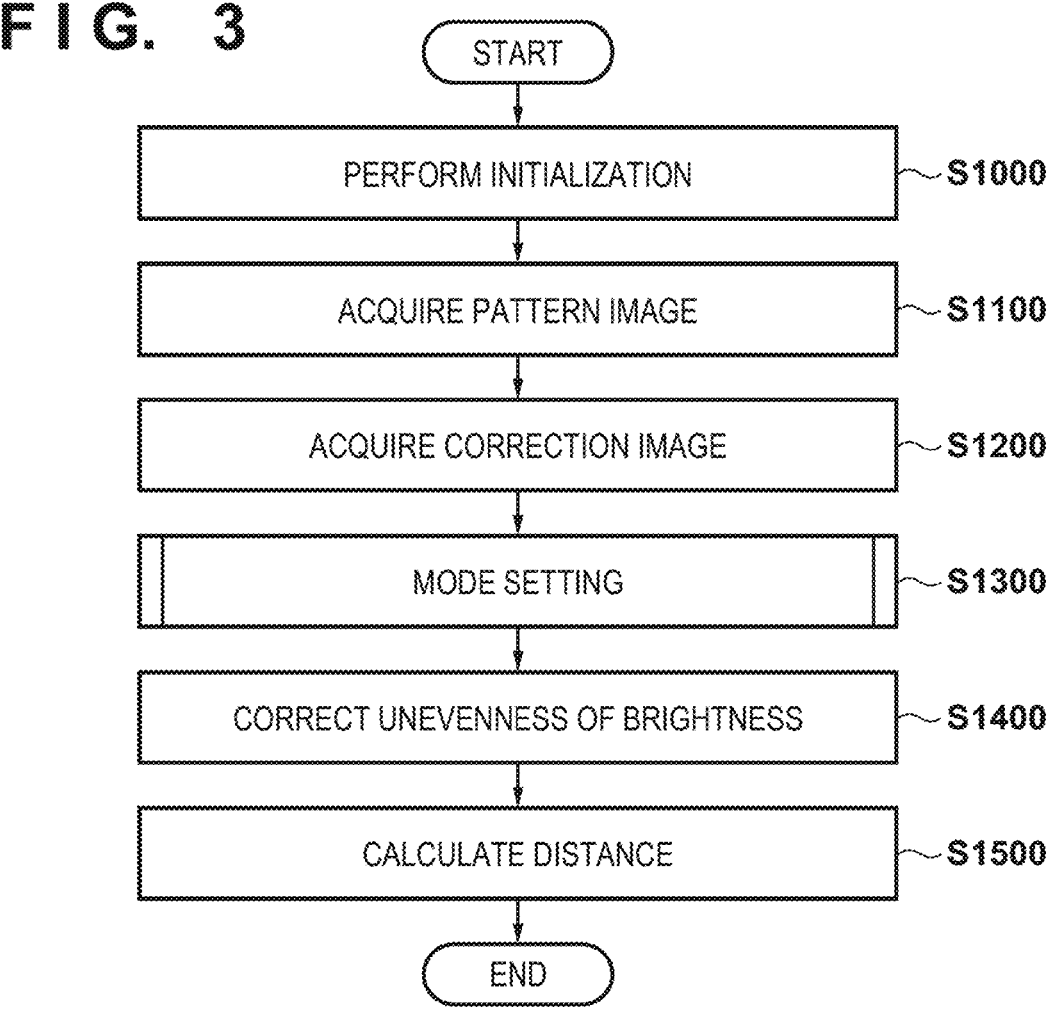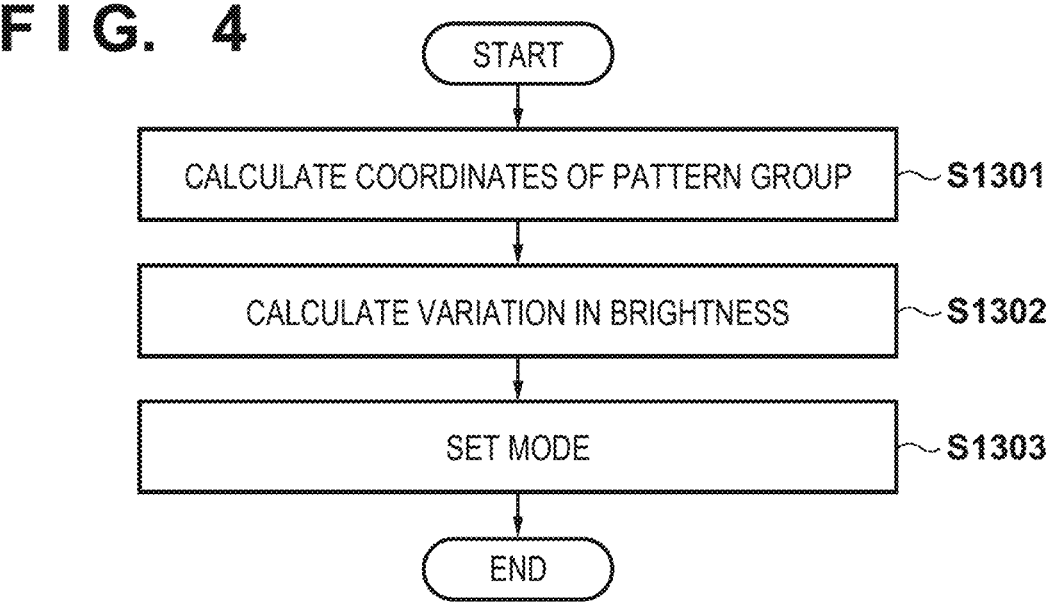

INFORMATION PROCESSING APPARATUS, INFORMATION PROCESSING METHOD, AND NON-TRANSITORY COMPUTER-READABLE STORAGE MEDIUM

BACKGROUND OF THE INVENTION

Field of the Invention

The present invention relates to a technique for measuring the three-dimensional shape of an object.

Description of the Related Art

Along with recent development of robot technology, robots are replacing humans to do complex tasks such as assembly of industrial parts with small shapes, which have been done by humans. In order for the robots to grip the parts, it is necessary to accurately measure the three-dimensional shapes of the parts to be gripped.

As a representative example of a method of measuring the three-dimensional shape of a measurement target object, there is provided an active measurement method using an image capturing device and a projection device in combination. In the active measurement method, the projection device projects pattern light toward the measurement target object, and the position detection element of the image capturing device receives reflected light of a projection pattern reflected by the measurement target object. Based on the position information of the image capturing pattern received by the position detection element and the relative position and orientation of the image capturing device and the projection device, it is possible to measure a distance to the measurement target object by the triangulation principle.

Conventionally, there is a problem in which in this type of three-dimensional shape measurement device, unevenness of the brightness of a pattern image occurs due to a variation in a reflectance distribution on the surface of the measurement target object, the bias of the illuminance distribution of a light source, or the like, thereby degrading the measurement accuracy. To solve this problem, according to Japanese Patent Laid-Open No. 3-289505, the unevenness of the brightness of a pattern image is corrected using a grayscale image of a part at the time of total irradiation, that is obtained by totally irradiating the entire surface of a measurement target object with light by a total irradiation unit for performing irradiation with light of the same illuminance distribution as that of the light source of pattern light, thereby improving the three-dimensional measurement accuracy.

However, if the unevenness of the brightness of the surface of a part is small or if the reflectance of the surface of a part is low and thus the reflection brightness of a pattern is low, correction by a method of correcting the unevenness of the brightness degrades the measurement accuracy.

SUMMARY OF THE INVENTION

The present invention has been made in consideration of the above problem, and provides a technique for measuring the three-dimensional shape of an object more accurately.

According to one aspect of the present invention, there is provided an information processing apparatus comprising: a determination unit configured to determine, based on one of a first image of an object onto which pattern light for three-dimensional shape measurement is projected and a second image of the object onto which the pattern light is not projected, whether to correct unevenness of brightness of the first image; and a measurement unit configured to measure a three-dimensional shape of the object using, if the determination unit determines to perform correction, a corrected image obtained by correcting the unevenness of the brightness of the first image based on the second image, and using, if the determination unit determines not to perform correction, the first image.

According to another aspect of the present invention, there is provided an information processing method comprising: determining, based on one of a first image of an object onto which pattern light for three-dimensional shape measurement is projected and a second image of the object onto which the pattern light is not projected, whether to correct unevenness of brightness of the first image; and measuring a three-dimensional shape of the object using, if it is determined in the determining to perform correction, a corrected image obtained by correcting the unevenness of the brightness of the first image based on the second image, and using, if it is determined in the determining not to perform correction, the first image.

According to still another aspect of the present invention, there is provided a non-transitory computer-readable storage medium storing a computer program for causing a computer to function as: a determination unit configured to determine, based on one of a first image of an object onto which pattern light for three-dimensional shape measurement is projected and a second image of the object onto which the pattern light is not projected, whether to correct unevenness of brightness of the first image; and a measurement unit configured to measure a three-dimensional shape of the object using, if the determination unit determines to perform correction, a corrected image obtained by correcting the unevenness of the brightness of the first image based on the second image, and using, if the determination unit determines not to perform correction, the first image.

According to yet another aspect of the present invention, there is provided an information processing apparatus comprising: a setting unit configured to set, based on one of a first image of an object onto which pattern light for three-dimensional shape measurement is projected and a second image of the object onto which the pattern light is not projected, a degree of correction of unevenness of brightness of the first image; and a measurement unit configured to measure a three-dimensional shape of the object using a corrected image obtained by correcting the unevenness of the brightness of the first image based on the second image and the degree of correction of the unevenness of the brightness, which has been set by the setting unit.

Further features of the present invention will become apparent from the following description of exemplary embodiments (with reference to the attached drawings).

BRIEF DESCRIPTION OF THE DRAWINGS

FIG. 3 is a flowchart illustrating the overall processing of three-dimensional shape measurement;

FIG. 4 is a flowchart illustrating details of processing in step S1300;

DESCRIPTION OF THE EMBODIMENTS

Embodiments of the present invention will be described below with reference to the accompanying drawings. Note that the embodiments to be described below are merely examples when the present invention is practiced concretely, and are practical embodiments of arrangements described in the appended claims.

First Embodiment

This embodiment will explain an arrangement of projecting pattern light for three-dimensional shape measurement and uniform illumination light for correction image acquisition onto a single measurement target object and switching ON/OFF of an unevenness-of-brightness correction mode based on a variation in brightness in a captured image of the measurement target object onto which the pattern light is projected. In this embodiment, a variation in brightness in the captured image is evaluated as an index representing the magnitude of the unevenness of the brightness of the captured image of the measurement target object onto which the pattern light is projected, and the unevenness-of-brightness correction mode is turned on only when the variation in brightness is nonuniform. More specifically, if the variation in brightness is large, the unevenness-of-brightness correction mode is turned on, and if the variation in brightness is small, the unevenness-of-brightness correction mode is turned off. With this operation, if the unevenness of the brightness in the captured image of the measurement target object onto which the pattern light is projected is small, the captured image is not corrected, thereby making it possible to perform three-dimensional measurement accurately.

Figure 1:
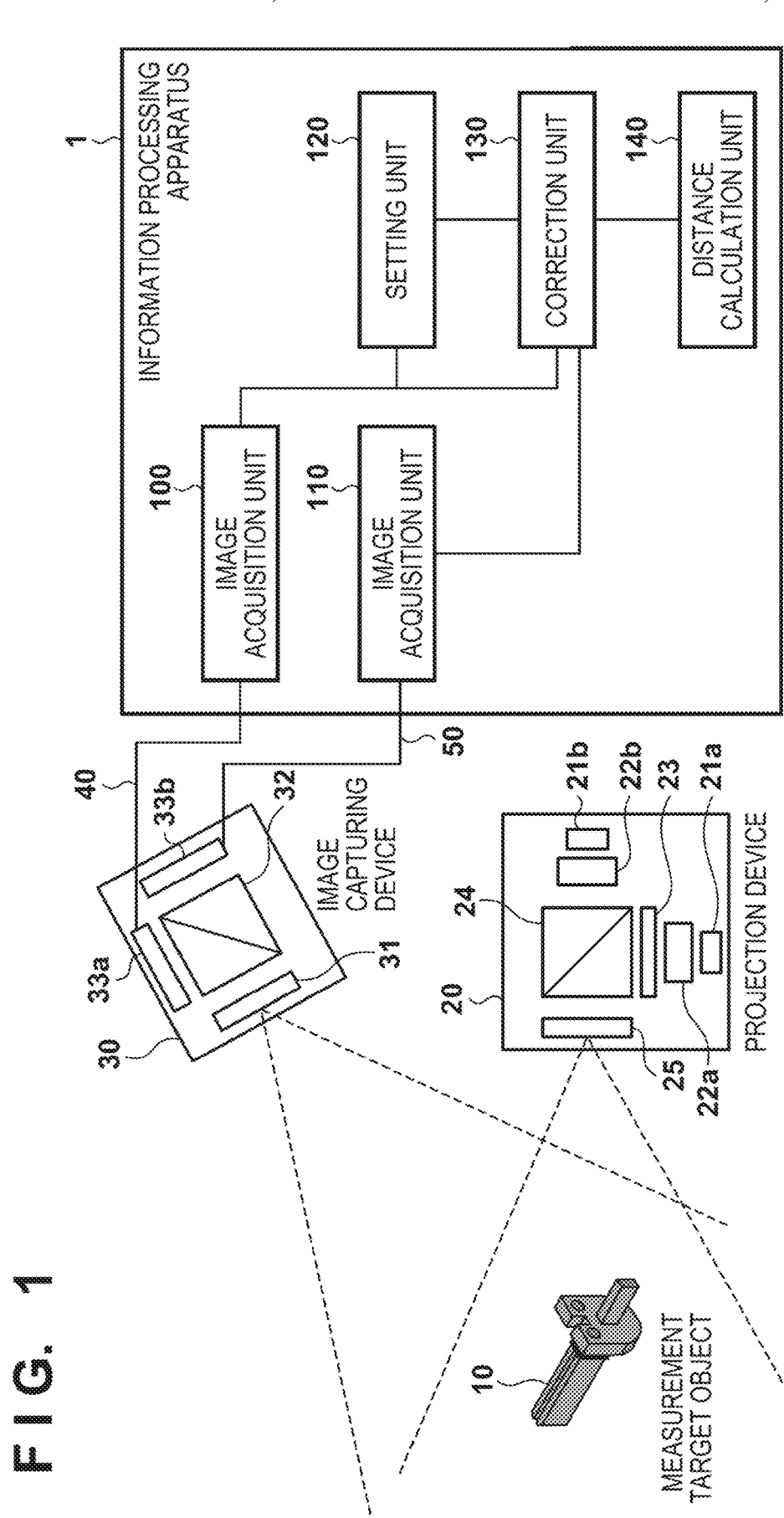
FIG. 1 is a block diagram showing an example of the functional arrangement of a three-dimensional shape measurement system.

An example of the functional arrangement of a three-dimensional shape measurement system according to this embodiment will be described with reference to a block diagram shown in FIG. 1. As shown in FIG. 1, the three-dimensional shape measurement system according to this embodiment includes an image capturing device 30, a projection device 20, and an information processing apparatus 1.

The projection device 20 will be described first. According to this embodiment, the projection device 20 projects measurement pattern light formed from light of the first wavelength and uniform illumination light formed from light of the second wavelength different from the first wavelength onto a measurement target object 10. The measurement pattern light is pattern light to be projected onto the measurement target object 10 to measure the three-dimensional shape of the measurement target object 10, and corresponds to the above-described "pattern light for three-dimensional shape measurement". The uniform illumination light is light with which the measurement target object 10 is irradiated to obtain a captured image of the measurement target object 10 to be used to correct a captured image of the measurement target object 10 onto which the measurement pattern light is projected, and corresponds to the above-described "uniform illumination light for correction image acquisition".

A first light source 21a and a second light source 21b emit light beams of different wavelengths, respectively. In this embodiment, the first light source 21a emits light of the first wavelength, and the second light source 21b emits light of the second wavelength. An illumination optical system 22a is an optical system that uniformly illuminates a pattern mask 23 with the light of the first wavelength from the first light source 21a, and an illumination optical system 22b is an optical system that uniformly illuminates the pattern mask 23 with the light of the second wavelength from the second light source 21b. The illumination optical systems 22a and 22b are each configured to provide, for example, Kohler illumination. The pattern mask 23 has a transmission portion corresponding to the measurement pattern light to be projected onto the measurement target object 10, which is formed by, for example, plating a glass substrate with chromium. A dichroic prism 24 is an optical element that combines light transmitted through the pattern mask 23 from the illumination optical system 22a and the uniform illumination light from the illumination optical system 22b. A projection optical system 25 is an optical system that forms, on the measurement target object 10, an image of light combined by the dichroic prism 24, and projects, onto the measurement target object 10, the measurement pattern light of the first wavelength transmitted through the pattern mask 23 and the uniform illumination light of the second wavelength. With this arrangement, it is possible to almost simultaneously project the measurement pattern light and the uniform illumination light onto the measurement target object 10 from almost the same position. The uniform illumination light is projected onto the entire surface of the measurement target object 10 as light of the uniform illuminance distribution.

Figure 2B:
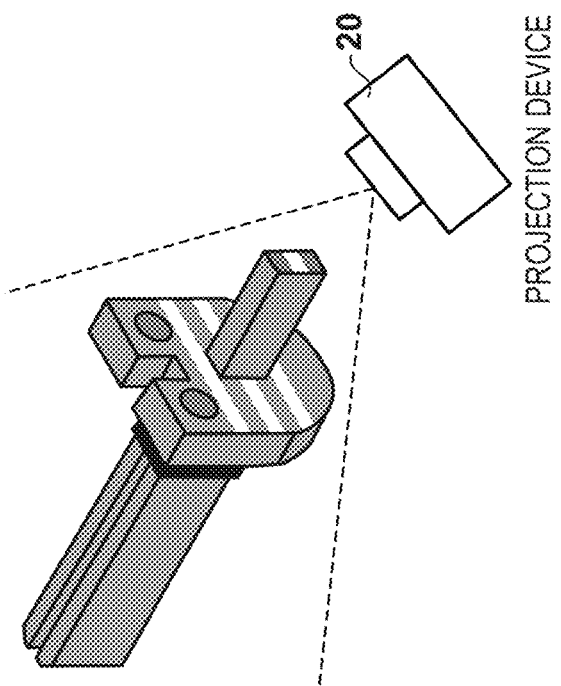
FIG. 2B is a view for explaining the measurement pattern light.
Figure 2A:
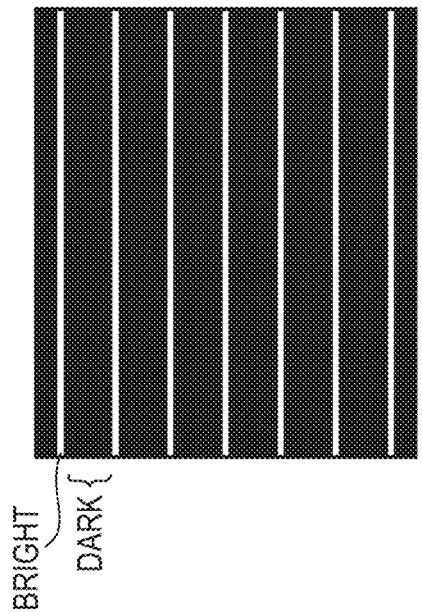
FIG. 2A is a view for explaining measurement pattern light.

A pattern (measurement pattern) represented by the measurement pattern light projected by the projection device 20 is, for example, a multi-line pattern, as shown in FIG. 2A, and the direction of each line is almost perpendicular to a base-line direction between the projection device 20 and the image capturing device 30.

The image capturing device 30 will be described next. The image capturing device 30 separates, based on the wavelengths, the measurement pattern light and uniform illumination light projected onto the measurement target object 10, and captures images at the same time, thereby acquiring the images as a pattern image 40 and a correction image 50, both of which have the same viewpoint. The pattern image 40 is a captured image (including no uniform illumination light) of the measurement target object 10 onto which the measurement pattern light is projected, and the correction image 50 is a captured image (including no measurement pattern light) of the measurement target object 10 onto which the uniform illumination light is projected.

An imaging optical system 31 is an optical system that forms, on a first image sensor 33a, an image of the measurement pattern light projected onto the measurement target object 10, and forms, on a second image sensor 33b, an image of the uniform illumination light projected onto the measurement target object 10. A dichroic prism 32 is an optical element that separates the measurement pattern light and uniform illumination light projected onto the measurement target object 10. The first image sensor 33a is an image sensor that generates the pattern image 40 by capturing the measurement pattern light separated by the dichroic prism 32. The second image sensor 33b is an image sensor that generates the correction image 50 by capturing the uniform illumination light separated by the dichroic prism 32. The first image sensor 33a and the second image sensor 33b are each formed by, for example, a CMOS sensor, a CCD sensor, or the like. An image generation method may be any method capable of obtaining an image of reflected light such as a grayscale or color image. The first image sensor 33a and the second image sensor 33b send the generated pattern image 40 and correction image 50 to the information processing apparatus 1, respectively.

Note that intrinsic parameters such as the focal lengths, principal point positions, and lens distortion parameters of the projection device 20 and image capturing device 30, and the relative position and orientation between the devices are calibrated in advance by, for example, a method disclosed in a literature below.

R. Y. Tsai, "A versatile camera calibration technique for high-accuracy 3D machine vision metrology using off-the-shelf TV cameras and lenses", IEEE Journal of Robotics and Automation, vol. RA-3, no. 4, 1987.

The relative position and orientation between the projection device 20 and the image capturing device 30 are given by parameters of six degrees of freedom represented by translation components (x, y, z) and rotation components (α, β, γ) indicated by Euler angles.

The information processing apparatus 1 will be described next. An image acquisition unit 100 acquires the pattern image 40 sent from the first image sensor 33a. An image acquisition unit 110 acquires the correction image 50 sent from the second image sensor 33b. As shown in FIG. 2B, the reflected light of the measurement pattern light is observed on the measurement target object 10 in the pattern image 40. A setting unit 120 switches ON/OFF of the unevenness-of-brightness correction mode based on a variation in brightness in the pattern image 40. Note that "a variation in brightness in the pattern image 40" is evaluated by the variance of peak brightness in the pattern image 40. More specifically, a "variation in brightness" serving as a reference for switching ON/OFF of the unevenness-of-brightness correction mode is registered in advance in the information processing apparatus 1. At the time of three-dimensional shape measurement of the measurement target object 10, the measurement pattern light is extracted from the pattern image 40, and the variance of peak brightness of the extracted measurement pattern light is calculated. If the calculated variance of the peak brightness is equal to or larger than the registered reference, the unevenness-of-brightness correction mode is turned on. If the calculated variance is smaller than the registered reference, the unevenness-of-brightness correction mode is turned off.

If the unevenness-of-brightness correction mode is ON, a correction unit 130 corrects the unevenness of the brightness of the pattern image 40 acquired by the image acquisition unit 100 using the correction image 50 acquired by the image acquisition unit 110, and outputs the post-correction pattern image 40 as a distance calculation image. On the other hand, if the unevenness-of-brightness correction mode is OFF, the correction unit 130 outputs the pattern image 40 as a distance calculation image without correcting the unevenness of the brightness of the pattern image 40 acquired by the image acquisition unit 100.

A distance calculation unit 140 obtains the three-dimensional shape of the measurement target object 10 by a light-section method using the distance calculation image output from the correction unit 130. A technique of measuring the three-dimensional shape of an object, onto which measurement pattern light is projected, by the light-section method using a captured image of the object is well known and a description thereof will be omitted.

Overall processing performed by the information processing apparatus 1 to measure the three-dimensional shape of the measurement target object 10 will be described with reference to a flowchart shown in FIG. 3. In step S1000, the setting unit 120 registers a reference variance in the information processing apparatus 1 as a variation in brightness serving as a reference for switching the unevenness-of-brightness correction mode.

In step S1100, the image acquisition unit 100 acquires the pattern image 40 sent from the first image sensor 33a. In step S1200, the image acquisition unit 110 acquires the correction image 50 sent from the second image sensor 33b.

In step S1300, the setting unit 120 compares the magnitude of the variance of the peak brightness in the pattern image 40 acquired in step S1100 with the magnitude of the reference variance registered in the information processing apparatus 1 in step S1000. The setting unit 120 switches (selects) the unevenness-of-brightness correction mode to ON or OFF in accordance with the result of the magnitude comparison processing. The processing in step S1300 will be described in detail with reference to FIG. 4.

In step S1400, if the unevenness-of-brightness correction mode is ON, the correction unit 130 corrects the unevenness of the brightness of the pattern image 40 using the correction image 50 in accordance with equation (1) below, and outputs the post-correction pattern image 40 (corrected image) as a distance calculation image.

$$I_{div}(u, v) = \frac{I_{pat}(u, v)}{I_{gray}(u, v) + 1} \quad (1)$$

where (u, v) represents a pixel position in the image, and Ipat(u, v), Igray(u, v), and Idiv(u, v) represent the brightness values of the pattern image 40, the correction image 50, and the pattern image 40 having undergone correction of the unevenness of the brightness at the pixel position (u, v), respectively. In equation (1), 1 is added to Igray(u, v) in order to avoid a case in which a denominator becomes 0.

On the other hand, if the unevenness-of-brightness correction mode is OFF, the correction unit 130 outputs the pattern image 40 as a distance calculation image without correcting the unevenness of the brightness of the pattern image 40 acquired in step S1100.

In step S1500, the distance calculation unit 140 obtains the three-dimensional shape of the measurement target object 10 by the light-section method using the distance calculation image output from the correction unit 130 in step S1400.

The processing in step S1300 will be described in detail next with reference to a flowchart shown in FIG. 4. In step S1301, the setting unit 120 obtains the peak coordinates of the measurement pattern (pattern group) included in the pattern image 40. In this embodiment, as a method of calculating the peak coordinates of the measurement pattern, a method of detecting, as peak coordinates, image coordinates, at which the brightness has an extreme value, in the measurement pattern projected onto the measurement target object 10 in the pattern image 40 is adopted. As the method of detecting the image coordinates, for example, BR2 Detector described in a literature below is used.

D. K. Naidu, R. B. Fisher, "A Comparative Analysis of Algorithms for Determining the Peak Position of a Stripe to Sub-pixel Accuracy", British Machine Vision Conf 1991, pp. 217-225, 1991

In step S1302, the setting unit 120 obtains a variance V of the brightness as a variation in brightness at the peak coordinates obtained in step S1301. In step S1303, the setting unit 120 compares the magnitude of the variance V obtained in step S1302 with the magnitude of the reference variance registered in the information processing apparatus 1 in step S1000. If, as a result of the magnitude comparison, variance V≥reference variance (predetermined variance), the setting unit 120 sets the unevenness-of-brightness correction mode to ON; otherwise, the setting unit 120 sets the unevenness-of-brightness correction mode to OFF.

As described above, according to this embodiment, if the unevenness of the brightness of the pattern image 40 is small, it is possible to prevent the pattern image 40 from being corrected, thereby performing three-dimensional measurement accurately.

Note that the projection device 20 according to this embodiment simultaneously projects the measurement pattern light and the uniform illumination light of different wavelengths, and the image capturing device 30 simultaneously acquires the pattern image 40 and the correction image 50, both of which have the same viewpoint. However, a method of acquiring the pattern image 40 and the correction image 50 is not limited to this. For example, using a projection device that switches an illumination pattern, such as a liquid crystal projector, an image may be captured once when the measurement pattern light of the same wavelength is projected and when the uniform illumination light is projected, thereby acquiring the pattern image 40 and the correction image 50, both of which have the same viewpoint. The correction image 50 need not always be a captured image obtained when projecting the uniform illumination light onto the measurement target object 10 using the projection device 20. For example, a captured image of the measurement target object 10 obtained when the measurement target object 10 is illuminated with ambient environmental light at the time of image capturing without projecting the measurement pattern light may be used as the correction image 50.

In this embodiment, a line pattern has been exemplified as the measurement pattern. However, the measurement pattern is not limited to this. For example, the above-described embodiment may be applied to a space encoding method, a phase shift method, and a method of measuring the three-dimensional shape of a measurement target object by projecting a bright and dark light pattern such as a random dot pattern.

In this embodiment, a variation in pattern peak brightness is calculated from the pattern image 40, and ON/OFF of the unevenness-of-brightness correction mode is switched in accordance with the variation. However, whether the unevenness-of-brightness correction mode is set to ON or OFF may be determined using a variation in brightness in the correction image 50 instead of the variance in pattern peak brightness in the pattern image 40.

In this embodiment, the pattern image 40 is corrected using the correction image 50 in accordance with equation (1) above. However, a method of correcting the pattern image 40 is not limited to this. For example, the projection device 20 may acquire, as correction images, a total irradiation image obtained when performing illumination with the uniform illumination light of the same wavelength as that of the measurement pattern light and a non-illuminated image captured while the object is not illuminated, thereby correcting the unevenness of the brightness by the method described in Japanese Patent Laid-Open No. 3-289505.

The pattern image 40 may be an image in any format as long as a target image in which the three-dimensional measurement pattern is projected onto the measurement target object is obtained, and may be, for example, a gray image or a color image. Furthermore, the pattern image 40 and the correction image 50 need not be acquired from the image capturing device 30 in real time, and may be images captured and saved in advance in a storage device.

Modification 1 of First Embodiment

In the first embodiment, ON/OFF of the unevenness-of-brightness correction mode is switched based on a variation in brightness in the pattern image 40. However, the unevenness of the brightness largely changes in accordance with background brightness at the time of measurement. For example, the background brightness in an image may unwantedly increase in accordance with the brightness of the environmental light at the time of measurement, it may be impossible to perform evaluation correctly based on a variation in brightness, and thus the accuracy may degrade. To cope with this, in this modification, the brightness contrast of the measurement pattern light is calculated from the pattern image 40, and ON/OFF of the unevenness-of-brightness correction mode is switched based on the calculated brightness contrast. In this modification and modifications and embodiments to be described below, the difference from the first embodiment will be mainly described, and the rest is assumed to be the same as in the first embodiment, unless otherwise specified.

In this modification, the setting unit 120 switches ON/OFF of the unevenness-of-brightness correction mode based on a variation in brightness contrast of the measurement pattern light in the pattern image 40. In this modification, the brightness gradient of the measurement pattern light is used as the brightness contrast. First, the setting unit 120 registers in advance, as a reference variance, in the information processing apparatus 1, a variation in brightness gradient serving as a reference for switching ON/OFF of the unevenness-of-brightness correction mode. At the time of measurement, the setting unit 120 extracts, for each line, the inclination value of the brightness, that is, the brightness gradient at the peak coordinates (the image coordinates at which the brightness has an extreme value in the measurement pattern projected onto the measurement target object 10 in the pattern image 40) in the pattern image 40. The setting unit 120 calculates the variance V of the brightness gradient for each line. The setting unit 120 compares the magnitude of the variance V with the magnitude of the reference variance (the variation in brightness gradient) registered in the information processing apparatus 1. If, as a result of the magnitude comparison processing, variance V≥reference variance, the setting unit 120 sets the unevenness-of-brightness correction mode to ON; otherwise, the setting unit 120 sets the unevenness-of-brightness correction mode to OFF.

Note that a method of calculating a brightness contrast is not limited to the above method. For example, a minimum brightness value C1 and maximum brightness value C2 of the measurement pattern may be specified by scanning in the vertical direction of the pattern, thereby calculating (C2−C1) as a brightness contrast. Alternatively, a background image when no pattern is projected may be captured in advance, and the difference between background brightness and pattern brightness at a pattern peak position may be used as a brightness contrast. In either case, any index representing the difference between the background brightness and the pattern brightness at the pattern peak position may be used as a brightness contrast. According to this modification, it is possible to correctly evaluate unevenness of brightness, regardless of the brightness of environmental light at the time of measurement, thereby performing three-dimensional measurement accurately.

In this modification, the brightness contrast of the measurement pattern light is calculated from the pattern image 40, and ON/OFF of the unevenness-of-brightness correction mode is switched in accordance with the brightness contrast. However, whether the unevenness-of-brightness correction mode is set to ON or OFF may be determined using the brightness contrast of the correction image 50 instead of the brightness contrast of the measurement pattern light in the pattern image 40.

Modification 2 of First Embodiment

In the first embodiment and Modification 1 thereof, the method of uniformly evaluating a variation in brightness or brightness contrast in the entire pattern image 40 and setting the unevenness-of-brightness correction mode has been explained. However, when a robot picks up an object, measurement target objects placed in a bulk state/piled state may be captured/measured. In this case, the measurement target objects are placed in different orientations. Therefore, if ON/OFF of the unevenness-of-brightness correction mode is determined in accordance with a variation in brightness or brightness contrast of the entire image, as in the first embodiment and Modification 1 thereof, the measurement accuracy may degrade for some measurement target objects. To solve this problem, Modification 2 of the first embodiment will describe a method of switching whether to correct the unevenness of the brightness for each region by switching ON/OFF of the unevenness-of-brightness correction mode based on a variation in brightness of the reflected light of the pattern for each region of the measurement target object 10 in the pattern image 40.

The setting unit 120 obtains the variance V of the peak brightness in the region of the measurement target object 10 in the pattern image 40, similarly to the first embodiment, and compares the magnitude of the obtained variance V with that of the reference variance registered in the information processing apparatus 1 in step S1000. If, as a result of the magnitude comparison processing, variance V≥reference variance, the setting unit 120 sets the unevenness-of-brightness correction mode to ON for image coordinates included in the region of the measurement target object 10 in the pattern image 40. On the other hand, if variance V<reference variance, the setting unit 120 sets the unevenness-of-brightness correction mode to OFF for image coordinates included in the region of the measurement target object 10 in the pattern image 40. Note that the setting unit 120 sets the unevenness-of-brightness correction mode to OFF for image coordinates outside the region of the measurement target object 10 in the pattern image 40. The setting unit 120 creates a table in which the unevenness-of-brightness correction mode set for each set of image coordinates is registered.

Note that a method of acquiring the region of the measurement target object 10 in the pattern image 40 is not limited to a specific acquisition method. For example, the setting unit 120 recognizes the measurement target object 10 from the correction image 50, thereby acquiring the region of the measurement target object 10 in the correction image 50. The region of the measurement target object 10 in the correction image 50 can be acquired by a method described in a literature below.

C. Rother, V. Kolmogorov, A. Blake, ""GrabCut"—Interactive Foreground Extraction using Iterated Graph Cuts", ACM Trans. Graph., 23, 3, pp. 309-314 (2004)

A region designated by the user on the correction image 50 displayed on the display screen of the information processing apparatus 1 may be acquired as the region of the measurement target object 10 in the correction image 50. Since the position of the region of the measurement target object 10 in the correction image 50 is the same as the position of the region of the measurement target object 10 in the pattern image 40, the processing can specify the position of the region of the measurement target object 10 in the pattern image 40.

Note that if the pattern image 40 includes a plurality of measurement target objects 10, the setting unit 120 sets the unevenness-of-brightness correction mode for the region of each measurement target object 10, as described above.

With reference to the above table, for each pixel in the pattern image 40, the correction unit 130 specifies whether the unevenness-of-brightness correction mode for the pixel is ON or OFF. The correction unit 130 corrects the unevenness of the brightness in accordance with equation (1) above for a pixel set with unevenness-of-brightness correction mode=ON, and performs no processing for a pixel set with unevenness-of-brightness correction mode=OFF.

According to this modification described above, for example, even if the pattern image 40 includes parts placed in a bulk state/piled state, it is possible to appropriately switch whether to correct the unevenness of the brightness for each image region, thereby stably performing three-dimensional measurement regardless of the orientations of the parts.

Second Embodiment

If a measurement target object has many surfaces, the reflection brightness of a pattern changes in accordance with the direction of each surface. If a surface tilts with respect to an imaging plane (sensor surface) of a camera that captures the measurement target object, the reflection brightness decreases. Thus, if the unevenness of the brightness of the surface is corrected, camera noise is unwantedly enhanced, thereby degrading the measurement accuracy. To solve this problem, this embodiment will describe a method of acquiring the normal direction of the surface of the measurement target object and switching, based on the normal direction, ON/OFF of an unevenness-of-brightness correction mode for the surface in a pattern image 40. In this embodiment, the normal direction of the surface of the measurement target object is acquired from a three-dimensional shape model imitating the shape of the measurement target object.

An example of the functional arrangement of a three-dimensional shape measurement system according to this embodiment will be described with reference to a block diagram shown in FIG. 5. In the three-dimensional shape measurement system according to this embodiment, an information processing apparatus 2 is used instead of the information processing apparatus 1 in the three-dimensional shape measurement system shown in FIG. 1. The information processing apparatus 2 is obtained by adding an input unit 250 and a setting unit 260 to the arrangement of the information processing apparatus 1.

The input unit 250 inputs a three-dimensional shape model as a model imitating the shape of a measurement target object 10. The three-dimensional shape model includes a local surface feature as local information on the three-dimensional shape model of each surface forming the three-dimensional shape model and a local line feature as local information on the three-dimensional shape model of each side forming the three-dimensional shape model.

The local surface feature is three-dimensional plane information including the three-dimensional position and three-dimensional direction components of the start point (in the local coordinate system of the three-dimensional shape model) of the normal vector of each surface forming the three-dimensional shape model, and exists for each surface of the three-dimensional shape model. The local coordinate system of the three-dimensional shape model is a coordinate system having one point in the three-dimensional shape model as an origin and having three axes orthogonal to each other at the origin as x-, y-, and z-axes. The local line feature is three-dimensional line information including the three-dimensional position (the three-dimensional position of one end of each side or the three-dimensional positions of two ends of each side) and three-dimensional direction components of each side forming the three-dimensional shape model, and exists for each side of the three-dimensional shape model. Note that in the following description, geometric features indicate both the local surface feature and the local line feature.

The setting unit 260 sets the position and orientation of the measurement target object 10 included in the pattern image 40. The set position and orientation are given by parameters of six degrees of freedom represented by translation components (x, y, z) and rotation components ($\alpha$, $\beta$, $\gamma$) indicated by Euler angles. The setting unit 260 may set, as the position and orientation of the measurement target object 10 included in the pattern image 40, the position and orientation input by operating a user interface using an operation unit such as a keyboard and mouse by the user. For example, the three-dimensional shape model is superimposed and displayed on the pattern image 40 on the display screen of the information processing apparatus 2. The user moves or rotates the three-dimensional shape model to match the position and orientation of the measurement target object 10 on the display screen by operating a GUI (Graphical User Interface) using the operation unit. Then, when the user determines that the position and orientation of the three-dimensional shape model match the position and orientation of the measurement target object 10 on the display screen, he/she inputs a determination instruction by operating the operation unit. In response to this input, the setting unit 260 sets the position and orientation of the three-dimensional shape model at this time as the position and orientation of the measurement target object 10 included in the pattern image 40.

A setting unit 120 projects, onto the pattern image 40, the three-dimensional shape model arranged in the set position and orientation. The setting unit 120 determines a surface for which the unevenness-of-brightness correction mode is set to ON/OFF, among the surfaces of the three-dimensional shape model projected onto the pattern image 40, based on the normal direction of the surface and the direction of the sensor surface of an image capturing device 30 (for example, the image capturing direction vector of the image capturing device 30).

The setting unit 120 creates a table in which unevenness-of-brightness correction mode=ON is registered for a pixel belonging to a surface set with unevenness-of-brightness correction mode=ON in the pattern image 40 and unevenness-of-brightness correction mode=OFF is registered for a pixel not belonging to the surface set with unevenness-of-brightness correction mode=ON.

With reference to the table created by the setting unit 120, for each pixel in the pattern image 40, a correction unit 130 specifies whether the unevenness-of-brightness correction mode for the pixel is ON or OFF. The correction unit 130 corrects the unevenness of the brightness in accordance with equation (1) above for a pixel set with unevenness-of-brightness correction mode=ON in the pattern image 40, and performs no processing for a pixel set with unevenness-of-brightness correction mode=OFF, thereby generating a distance calculation image.

Figure 6:
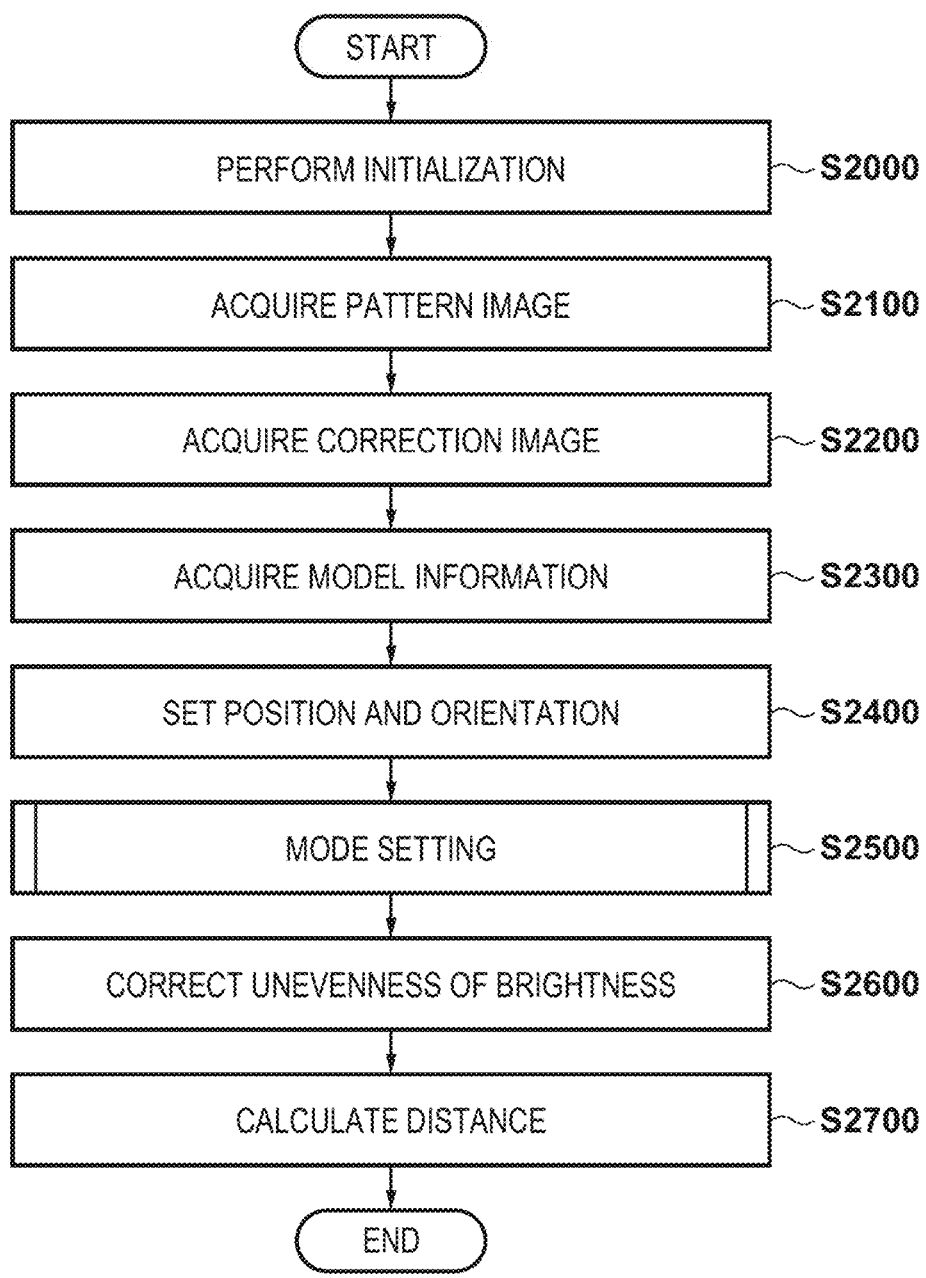
FIG. 6 is a flowchart illustrating the overall processing of three-dimensional shape measurement.

Overall processing performed by the information processing apparatus 2 to measure the three-dimensional shape of the measurement target object 10 will be described with reference to a flowchart shown in FIG. 6. In step S2000, the setting unit 120 initializes the table (sets the unevenness-of-brightness correction modes for all the pixels to OFF), and registers, in the information processing apparatus 2, "the degree of matching of the normal" serving as a reference for switching the unevenness-of-brightness correction mode. "The degree of matching of the normal" will be described later.

In step S2100, an image acquisition unit 100 acquires the pattern image 40 sent from a first image sensor 33$a$. In step S2200, an image acquisition unit 110 acquires a correction image 50 sent from a second image sensor 33$b$. In step S2300, the input unit 250 inputs a three-dimensional shape model as a model imitating the shape of the measurement target object 10.

In step S2400, the setting unit 260 sets the position and orientation of the measurement target object 10 included in the pattern image 40. In step S2500, the setting unit 120 projects, onto the pattern image 40, the three-dimensional shape model arranged in the position and orientation set in step S2400. Then, the setting unit 120 creates the above-described table in accordance with the magnitude relationship between "the degree of matching of the normal" registered in step S2000 and the degree of matching of the normal vector of the surface of the three-dimensional shape model projected onto the pattern image 40 and the direction vector of the sensor surface of the image capturing device 30. The processing in step S2500 will be described in detail later with reference to FIG. 7.

In step S2600, with reference to the table created by the setting unit 120, the correction unit 130 corrects the unevenness of the brightness in accordance with equation (1) above for a pixel set with unevenness-of-brightness correction mode=ON in the pattern image 40, and performs no processing for a pixel set with unevenness-of-brightness correction mode=OFF. In step S2700, the distance calculation unit 140 obtains the three-dimensional shape of the measurement target object 10, similarly to step S1500 described above.

Figure 7:
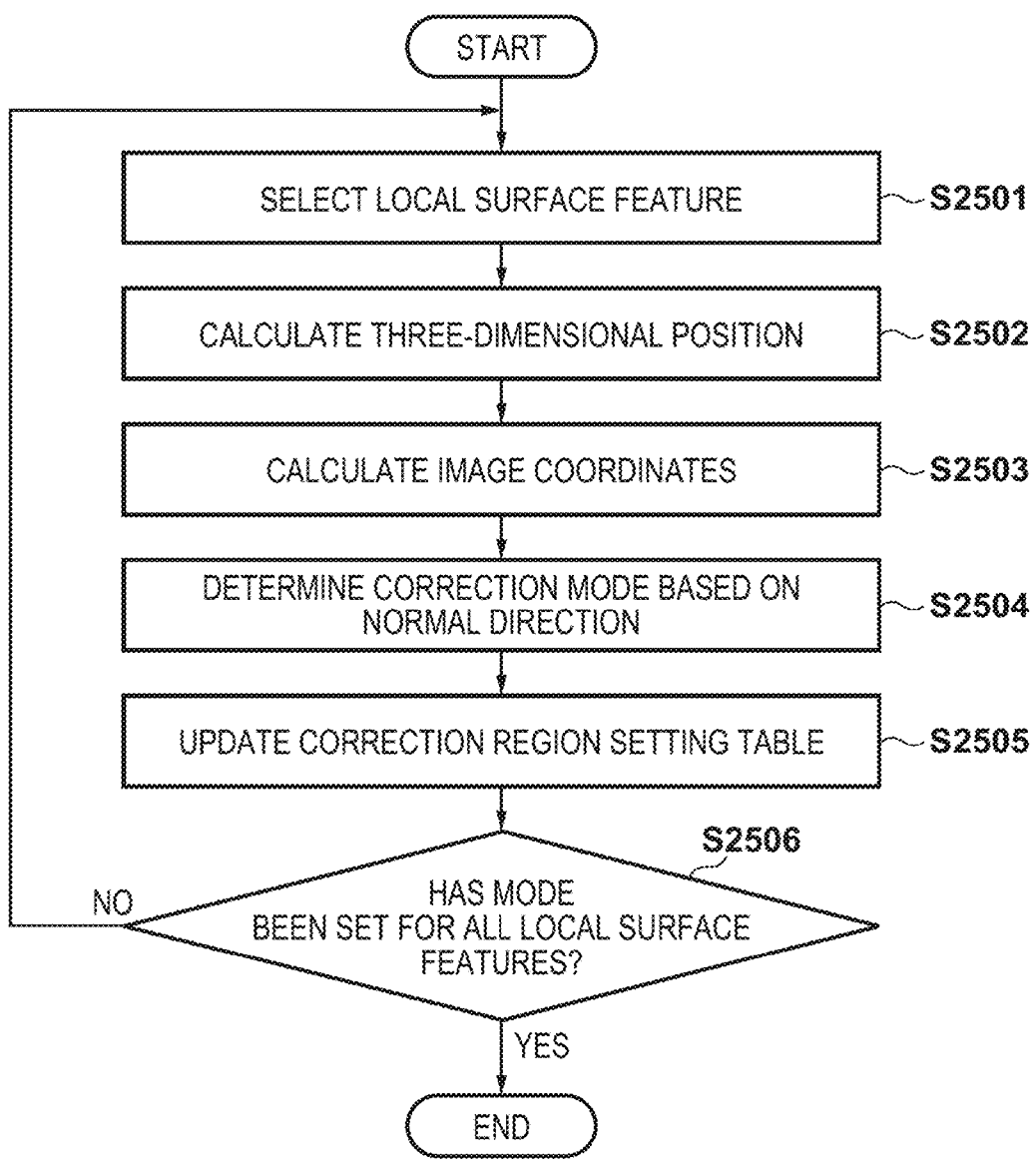
FIG. 7 is a flowchart illustrating details of processing in step S2500.

The processing in step S2500 will be described in detail with reference to a flowchart shown in FIG. 7. In step S2501, the setting unit 120 selects, as a selection local surface feature, one of unselected local surface features among the local surface features of the surfaces of the three-dimensional shape model.

In step S2502, the setting unit 120 converts a three-dimensional position (Xm, Ym, Zm) and three-dimensional direction components (Nxm, Nym, Nzm) included in the selection local surface feature selected in step S2501 based on a position (Tcm) and orientation (Rcm) set by the setting unit 260. This conversion processing is performed by:

$$\begin{bmatrix} X'_m \\ Y'_m \\ Z'_m \\ 1 \end{bmatrix} = \begin{bmatrix} R_{cm} & T_{cm} \\ 0 & 1 \end{bmatrix} \begin{bmatrix} X_m \\ Y_m \\ Z_m \\ 1 \end{bmatrix} \quad (2)$$

$$\begin{bmatrix} N'_{xm} \\ N'_{ym} \\ N'_{zm} \end{bmatrix} = R_{cm} \begin{bmatrix} N_{xm} \\ N_{ym} \\ N_{zm} \end{bmatrix} \quad (3)$$

Tcm is represented by a 3×1 column vector, and Rcm is represented by a 3×3 rotation matrix. Furthermore, (X'm, Y'm, Z'm) and (N'xm, N'ym, N'zm) respectively represent the converted three-dimensional position and three-dimensional direction components. The norm of the normal vector is normalized by 1. This conversion processing can acquire the position and orientation of the normal vector of the surface corresponding to the selection local surface feature.

In step S2503, the setting unit 120 converts the surface corresponding to the selection local surface feature (a surface surrounded by sides defined by corresponding local line features) based on the calibrated position and orientation of the image capturing device 30, thereby projecting the surface onto the pattern image 40.

In step S2504, the setting unit 120 obtains N'zm representing the degree of matching between the normal vector acquired by the conversion processing in step S2502 and a direction vector (0, 0, 1) of the sensor surface of the image capturing device 30. A method of obtaining the degree of matching between the two vectors is not limited to a specific method. For example, the difference between the two vectors may be set as the degree of matching, or an angle formed by the two vectors may be set as the degree of matching. If the degree of matching is larger than "the degree of matching of the normal" registered in step S2000, the setting unit 120 turns on the unevenness-of-brightness correction mode; otherwise, the setting unit 120 turns off the unevenness-of-brightness correction mode.

In step S2505, the setting unit 120 registers, in the table, the unevenness-of-brightness correction mode determined in step S2504 for a pixel belonging to the surface that has been projected onto the pattern image 40 in step S2503.

In step S2506, the setting unit 120 determines whether the local surface features of all the surfaces of the three-dimensional shape model have been selected as the selection local surface features. If, as a result of the determination processing, the local surface features of all the surfaces of the three-dimensional shape model have been selected as the selection local surface features, the process advances to step S2600. On the other hand, if, among the local surface features of the surfaces of the three-dimensional shape model, an unselected local surface feature remains, the process returns to step S2501.

Note that in this embodiment, the input unit 250 acquires the position and orientation of the three-dimensional shape model input by operating the GUI by the user. However, the position and orientation of the three-dimensional shape model may be acquired by another method. For example, a method described in a literature below may be used to obtain the position and orientation of the measurement target object 10 using edges on the correction image 50, distance point group data obtained by directly inputting the pattern image 40 to the distance calculation unit 140, and the local line features and local surface features of the three-dimensional shape model.

Tateno, Kotake, and Uchiyama, "A Model Fitting Method Using Intensity and Range Images for Bin-Picking Applications", Meeting on Image Recognition and Understanding—MIRU2010, OS5-1 (2010). 7

The position and orientation may be calculated by performing collation using the edges on the grayscale image or the distance point group data. Parameters representing the position and orientation of the measurement target object 10 may be input by another part recognition device or inertial sensor. Any input method may be used as long as position and orientation parameters of six degrees of freedom can be given.

The direction components of the normal vector of each surface of the three-dimensional shape model are examples of the direction components of the normal vector of each surface of the measurement target object 10. Data acquired by another method may be possible as long as the data represent the direction components of the normal vector of each surface of the measurement target object 10. For example, a mesh may be estimated from the three-dimensional point group data of the measurement target object 10 obtained by inputting the pattern image 40 to the distance calculation unit 140 without correcting it, and a perpendicular of the mesh may be acquired as a normal. Instead of the image acquired from the image capturing device 30, a result of estimating the normal to the measurement target object 10 using another three-dimensional measurement device may be used. A method of estimating the normal to the measurement target object 10 by photometric stereo instead of the three-dimensional point group data may be used. In either case, any method of estimating the normal direction of the surface of the measurement target object 10 can be used.

In this embodiment, the unevenness-of-brightness correction mode is set for each pixel in the pattern image 40. The unit for setting the unevenness-of-brightness correction mode is not limited to a pixel unit. For example, if the number of surfaces forming the measurement target object 10 is small, one unevenness-of-brightness correction mode may be set for the whole measurement target object 10. For example, a representative normal vector may be specified from the normal vectors of the surfaces of the three-dimensional shape model, and an unevenness-of-brightness correction mode corresponding to the degree of matching between the direction of the representative normal vector and the direction of the sensor surface of the image capturing device 30 may be set. As the representative normal vector, for example, the median or average value may be specified from the normal vectors of the surfaces of the three-dimensional shape model for each component, and the specified median or average value may be determined as the component of the representative normal vector. In either case, it is only necessary to set the unevenness-of-brightness correction mode based on the degree of matching between the direction of the surface of the three-dimensional shape model and the direction of the sensor surface. As described above, according to the second embodiment, correction is not performed if the measurement surface of the measurement target object tilts with respect to the image capturing direction to decrease the reflection brightness of the pattern, thereby making it possible to perform three-dimensional measurement accurately.

Modification 1 of Second Embodiment

In the second embodiment, ON/OFF of the unevenness-of-brightness correction mode is determined based on the direction of the normal to the surface of the measurement target object. In fact, however, the light distribution characteristic of reflection changes depending on the material of the surface. In consideration of this, the unevenness-of-brightness correction mode needs to be determined. This embodiment will describe a method of estimating reflection brightness in consideration of the reflectance of the surface in addition to the direction of the normal to the surface, that has been described in the second embodiment, and switching ON/OFF of the unevenness-of-brightness correction mode. The difference from the second embodiment will be described below.

In this embodiment, the three-dimensional shape model includes information indicating the reflectance characteristic of each surface of the three-dimensional shape model. More specifically, since a reflection intensity according to this modification is estimated using the Torrance-Sparrow reflection model, it is registered in advance in the information processing apparatus 2 by using, as parameters, the color of a diffuse reflection component, the color of a specular reflection component, the surface roughness of each surface.

The setting unit 120 projects, onto the pattern image 40, the three-dimensional shape model arranged in the position and orientation set by the setting unit 260. Based on the direction of the normal to the surface of the there-dimensional shape model projected onto the pattern image 40, the reflectance of the surface, the direction of the light source of the pattern light projected from the projection device 20, and the direction of the sensor surface of the image capturing device 30, the setting unit 120 determines the brightness of the pattern light on the surface. Then, the setting unit 120 sets the unevenness-of-brightness correction mode of the surface based on the determined brightness.

In this modification, processes in steps S2000 and S2500 are different from those in the second embodiment. In step S2000, the setting unit 120 performs the following processing. That is, the setting unit 120 initializes the table (sets the unevenness-of-brightness correction mode to OFF for all the pixels), and registers, in the information processing apparatus 2, the "reflection intensity range" as a reference for switching the unevenness-of-brightness correction mode. The "reflection intensity range" will be described later.

Figure 8:
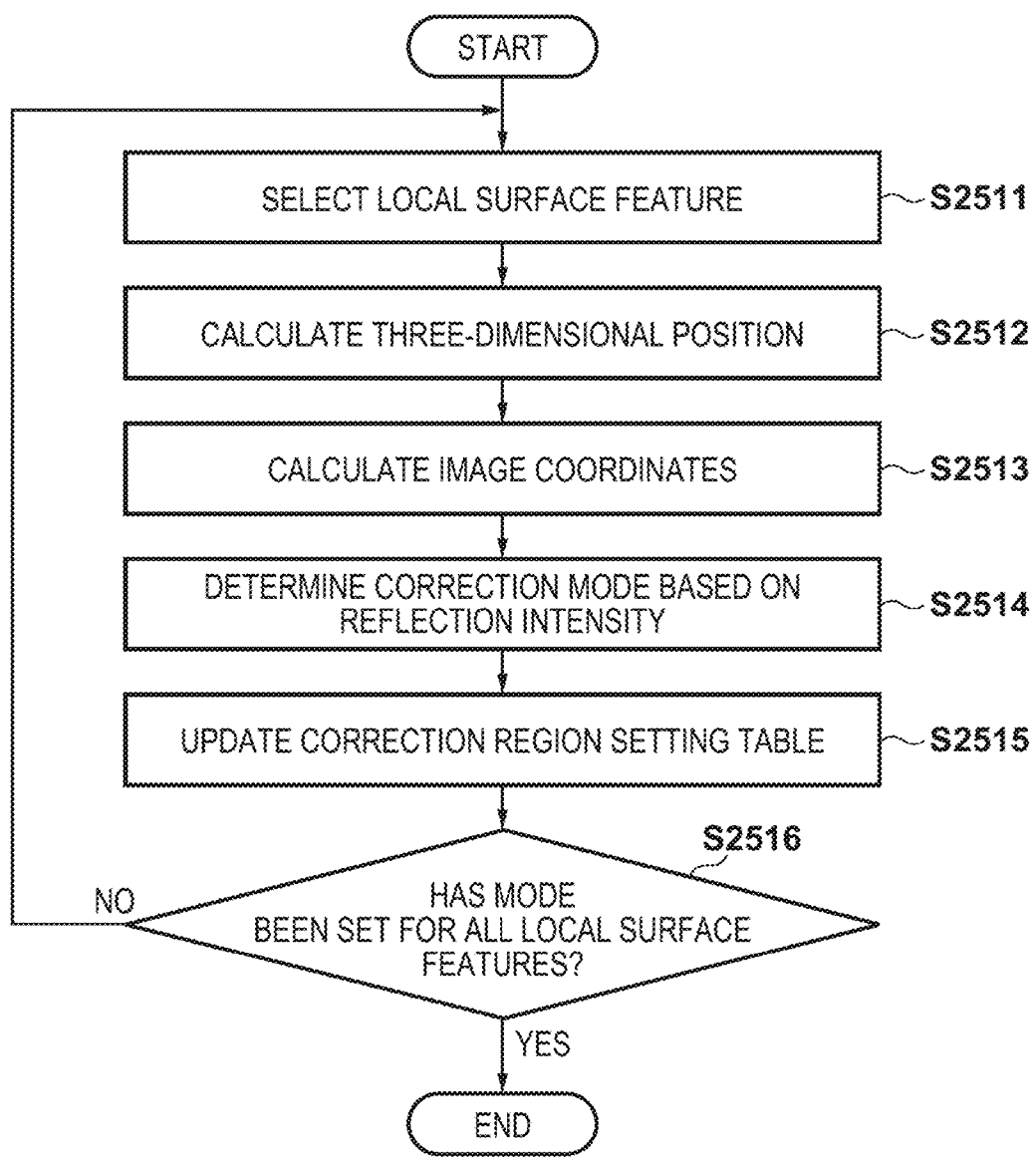
FIG. 8 is a flowchart illustrating details of the processing in step S2500.

In step S2500, the setting unit 120 performs processing according to a flowchart shown in FIG. 8. In step S2511, the setting unit 120 selects, as a selection local surface feature, one of unselected local surface features among the local surface features of the surfaces of the three-dimensional shape model.

In step S2512, the setting unit 120 converts the three-dimensional position (Xm, Ym, Zm) and three-dimensional direction components (Nxm, Nym, Nzm) included in the selection local surface feature selected in step S2511, similarly to step S2502 described above.

In step S2513, the setting unit 120 converts the surface corresponding to the selection local surface feature (a surface surrounded by sides defined by corresponding local line features) based on the calibrated position and orientation of the image capturing device 30, thereby projecting the surface onto the pattern image 40.

In step S2514, the setting unit 120 performs calculation according to equation (4) below with respect to the surface corresponding to the selection local surface feature, thereby obtaining a reflected light intensity I (an RGB value representing the intensity of the color signal of reflected light) from the surface.

$$I = K_d \cos\theta_i + K_s \frac{1}{\cos\theta_r} \exp\left(-\frac{\alpha^2}{2\sigma^2}\right) \quad (4)$$

In this modification, estimation is performed using the Torrance-Sparrow reflection model. In equation (4), $\theta i$ represents an angle formed by the direction of the light source of the pattern light and the direction of the normal vector obtained in step S2512, $\theta r$ represents an angle formed by the direction of the sensor surface of the image capturing device 30 and the direction of the normal vector obtained in step S2512, and $\alpha$ represents an angle formed by the direction of the normal vector obtained in step S2512 and a bisector between the direction of the light source of the pattern light and the direction of the sensor surface of the image capturing device 30. In the Torrance-Sparrow dichromatic reflection model, the reflected light intensity from the surface corresponding to the selection local surface feature is given by equation (4) above.

The first and second terms on the right-hand side of equation (4) above respectively represent the diffuse reflection component and the specular reflection component. In equation (4), Kd=(Kdr, Kdg, Kdb) represents the RGB intensity of the diffuse reflection component, Ks=(Ksr, Ksg, Ksb) represents the RGB intensity of the specular reflection component, and $\sigma$ represents the roughness (the standard deviation of the tilts of minute surfaces) on the surface of the measurement target object 10.

If the reflected light intensity I obtained based on equation (4) falls within the "reflection intensity range" registered in step S2000, the setting unit 120 turns on the unevenness-of-brightness correction mode for the selection local surface feature; otherwise, the setting unit 120 turns off the unevenness-of-brightness correction mode for the selection local surface feature.

In step S2515, the setting unit 120 registers, in the table, the unevenness-of-brightness correction mode determined in step S2514 for a pixel belonging to the surface that has been projected onto the pattern image 40 in step S2513.

In step S2516, the setting unit 120 determines whether the local surface features of all the surfaces of the three-dimensional shape model have been selected as the selection local surface features. If, as a result of the determination processing, the local surface features of all the surfaces of the three-dimensional shape model have been selected as the selection local surface features, the process advances to step S2600. On the other hand, if, among the local surface features of the surfaces of the three-dimensional shape model, an unselected local surface feature remains, the process returns to step S2511.

Note that in this modification, the reflection intensity is estimated using the Torrance-Sparrow reflection model. However, a reflection intensity estimation method is not limited to a specific estimation method. For example, the reflection brightness may be estimated using another reflection model such as the Phong reflection model or Lambert diffuse reflection model. In either case, any method capable of estimating the reflection intensity on the surface corresponding to the local surface feature can be used.

In this modification, the unevenness-of-brightness correction mode is set for each pixel in the pattern image 40. However, the unit for setting the unevenness-of-brightness correction mode is not limited to a pixel unit. For example, if the number of surfaces forming the measurement target object 10 is small, one unevenness-of-brightness correction mode may be set for the whole measurement target object 10, as described in the first embodiment. For example, representative reflection brightness may be specified from the reflection brightnesses of the surfaces of the three-dimensional shape model, and an unevenness-of-brightness correction mode may be set in accordance with whether the representative reflection brightness falls within the range registered in step S2000. As the representative reflection brightness, for example, the median or average value of the reflection brightnesses of the surfaces of the three-dimensional shape model is used. In either case, any method capable of estimating the reflection intensity on the surface corresponding to the local surface feature can be used. As described above, according to this modification, correction is not performed if the reflection brightness of the surface of the measurement target object is low, thereby making it possible to perform three-dimensional measurement accurately.

Modification 2 of Second Embodiment

The difference from the second embodiment will be described below. In the second embodiment and Modification 1 thereof, the method of switching ON/OFF of the unevenness-of-brightness correction mode in consideration of the reflection intensity in addition to the direction of the normal to the surface using the three-dimensional shape model of the measurement target object has been explained. However, unevenness of brightness occurs due to uneven reflection brightness caused by a difference in color or reflectance of a material within the same surface of the measurement target object. ON/OFF of the unevenness-of-brightness correction mode is preferably switched in consideration of unevenness of reflection brightness in addition to the magnitude of the reflection brightness. To achieve this, in this modification, a method of determining ON/OFF of the unevenness-of-brightness correction mode in consideration of the material parameter distribution of the measurement target object additionally will be described below.

In this modification, the local surface feature of each surface of the three-dimensional shape model includes a plurality of material parameters holding seven values (components) in total, that is, the color (three components) of the diffuse reflection component, the color (three components) of the specular reflection component, and the surface roughness (one component) of the surface, all of which are associated with the Torrance-Sparrow reflection model.

In this modification, processes in steps S2000 and S2500 are different from those in the second embodiment. In step S2000, the setting unit 120 performs the following processing. That is, the setting unit 120 initializes the table (sets the unevenness-of-brightness correction mode to OFF for all the pixels), and registers, in the information processing apparatus 2, the "degree of variation in each component" serving as a reference for switching the unevenness-of-brightness correction mode. The "degree of variation in each component" will be described later.

Figure 9:
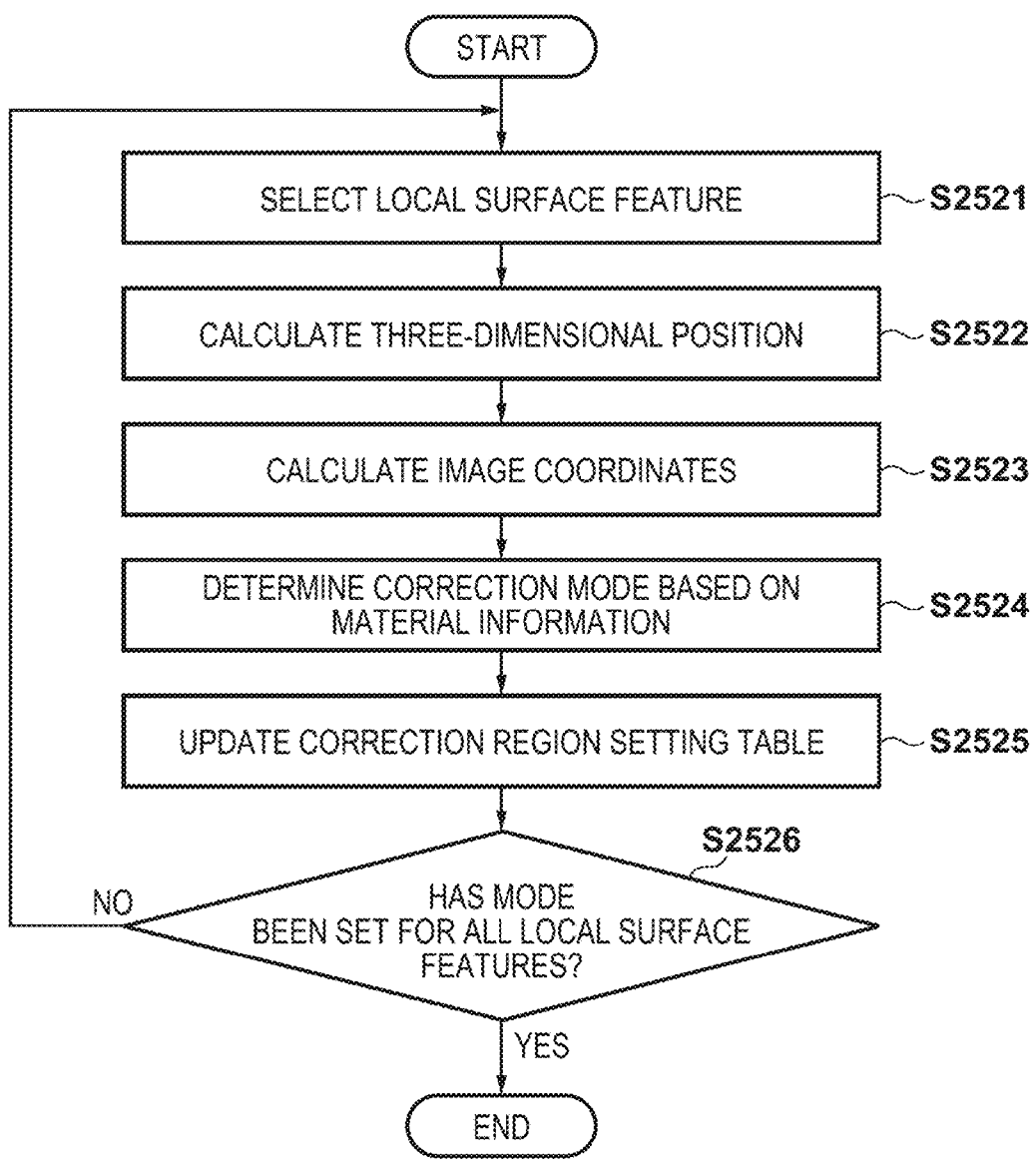
FIG. 9 is a flowchart illustrating details of the processing in step S2500.

In step S2500, the setting unit 120 performs processing according to a flowchart shown in FIG. 9. In step S2521, the setting unit 120 selects, as a selection local surface feature, one of unselected local surface features among the local surface features of the surfaces of the three-dimensional shape model.

In step S2522, the setting unit 120 converts the three-dimensional position (Xm, Ym, Zm) and three-dimensional direction components (Nxm, Nym, Nzm) included in the selection local surface feature selected in step S2521, similarly to step S2502 described above.

In step S2523, the setting unit 120 converts the surface corresponding to the selection local surface feature (a surface surrounded by sides defined by corresponding local line features) based on the calibrated position and orientation of the image capturing device 30, thereby projecting the surface onto the pattern image 40.

In step S2524, for each type of component of the material parameters included in the selection local surface feature, the setting unit 120 determines whether a variation in the component exceeds the reference corresponding to the component. If there are one or more components whose variations exceed the corresponding references, the setting unit 120 turns on the unevenness-of-brightness correction mode for the selection local surface feature. On the other hand, if there is no component whose variation exceeds the reference, the setting unit 120 turns off the unevenness-of-brightness correction mode for the selection local surface feature.

In step S2525, the setting unit 120 registers, in the table, the unevenness-of-brightness correction mode determined in step S2524 for a pixel belonging to the surface that has been projected onto the pattern image 40 in step S2523.

In step S2526, the setting unit 120 determines whether the local surface features of all the surfaces of the three-dimensional shape model have been selected as the selection local surface features. If, as a result of the determination processing, the local surface features of all the surfaces of the three-dimensional shape model have been selected as the selection local surface features, the process advances to step S2600. On the other hand, if, among the local surface features of the surfaces of the three-dimensional shape model, an unselected local surface feature remains, the process returns to step S2521.

Note that in this modification, the parameters associated with the Torrance-Sparrow reflection model are used as material parameters. However, the present invention is not limited to this. For example, any parameter associated with the reflection intensity such as a parameter representing the glossiness associated with the Phong reflection model can be used. Furthermore, as in Modification 1 of the second embodiment, the reflection intensity may be calculated and the determination processing may be performed based on a variation in reflection intensity. Not all the components need to be used, and ON/OFF of the unevenness-of-brightness correction mode may be determined based on a variation in at least one component. In either case, if a plurality of kinds of materials with different reflectances within the surface are combined, it is only necessary to determine ON/OFF of the unevenness-of-brightness correction mode for the surface based on variations in a plurality of characteristics associated with the reflectances on the surface.

In this modification, the local surface feature includes the material parameters. However, the present invention is not limited to this. For example, color information may be acquired, using a color image captured from the same viewpoint, from coordinates at which a surface corresponding to a local surface feature is projected onto the color image. Alternatively, the user may give the material parameters while visually perceiving the image. In either case, it is only necessary to provide the material information of the surface of the measurement target object 10. According to this modification, it is possible to prevent unevenness of brightness from being corrected if the material of the measurement target object is uniform, thereby making it possible to perform three-dimensional measurement accurately.

Third Embodiment

Figure 10:
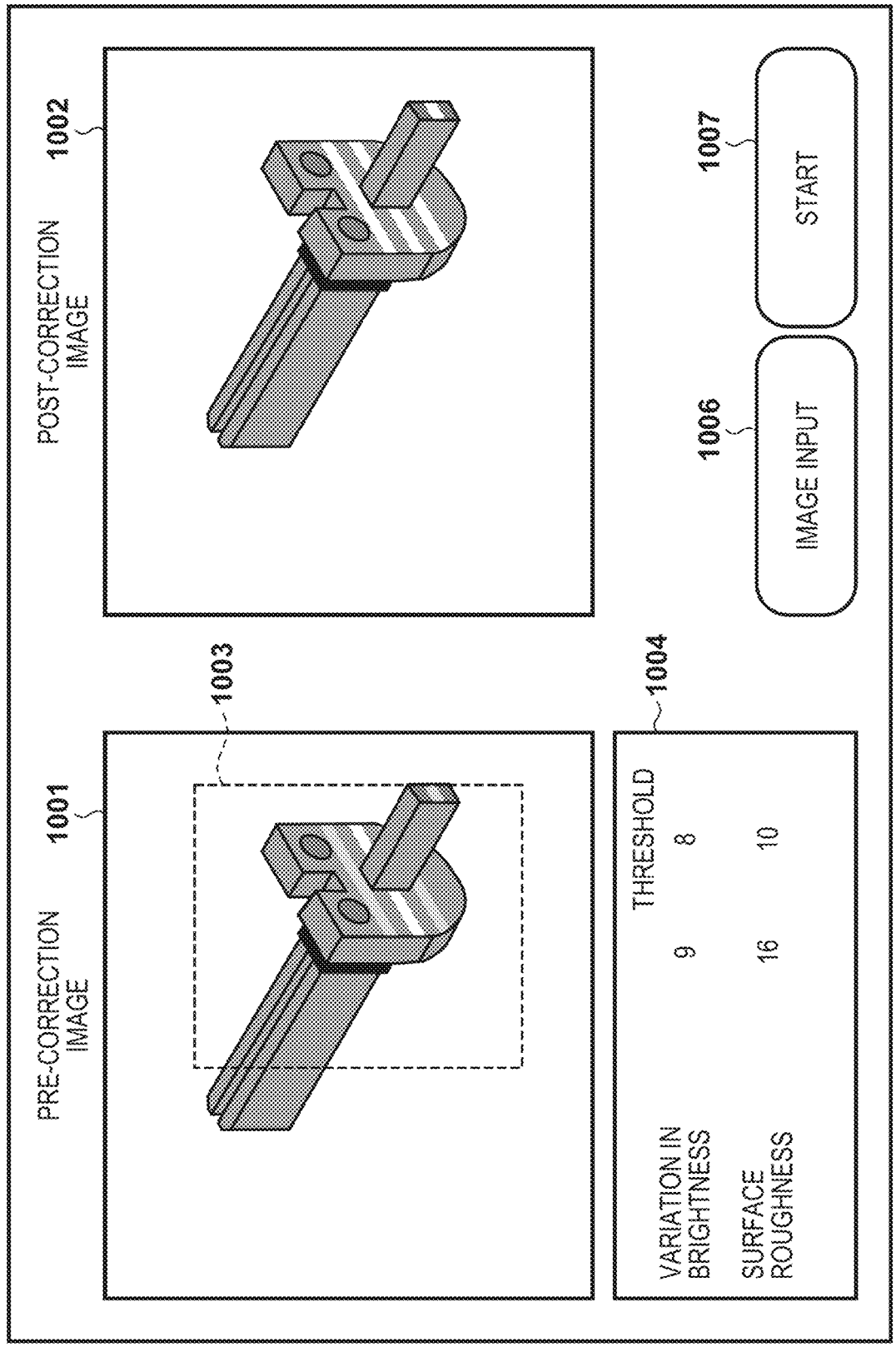
FIG. 10 is a view showing an example of the arrangement of a GUI.

In this embodiment, a GUI (Graphical User Interface) for setting various references used in the above-described embodiments and modifications will be described. An example of the reference setting GUI will be described with reference to FIG. 10. A GUI shown in FIG. 10 may be displayed on the display screen (not shown) of an information processing apparatus 1 (2) or the display screen of an apparatus different from the information processing apparatus 1 (2).

When the user instructs an image input button 1006 by operating an operation unit such as a keyboard or mouse, a list of candidates of a pattern image 40 is displayed on the display screen. When the user designates one candidate from the list by operating the operation unit, the designated image is displayed in a region 1001.

In a region 1004, as for a "variation in brightness", information indicating that a "variation in brightness" within a range 1003 designated by the user in the region 1001 is "9" (left side) and "8" (right side) is set as a reference (threshold) for the "variation in brightness" is displayed. In the region 1004, information indicating that "surface roughness" within the range 1003 designated by the user in the region 1001 is "16" (left side) and "10" (right side) is set as a reference (threshold) for the "surface roughness" is displayed. The user can change these thresholds appropriately by operating the operating the operation unit. A method of changing the thresholds is not limited to a specific change method. For example, a slider bar may be provided for each threshold, and the user may operate the slider bar leftward or rightward by operating the operation unit to increase or decrease the corresponding threshold, thereby setting the threshold. Alternatively, a text box may be provided for each threshold, and the user may directly input a numerical value to the text box by operating the operation unit, thereby setting the corresponding threshold.

When the user instructs a start button 1007 by operating the operation unit, a distance calculation image is generated from the pattern image 40 displayed in the region 1001 by one of the methods described in the above embodiments and modifications based on the reference values set in the region 1004. The generated distance calculation image is displayed as a post-correction image in a region 1002. The user can adjust the reference values set in the region 1004 while comparing the image displayed in the region 1001 with the image displayed in the region 1002.

Note that the range 1003 designated in the region 1001 by the user using the operation unit may be set as a range within which unevenness of brightness is corrected in the image displayed in the region 1001. In this case, if the start button 1007 is instructed, only a partial image within the range 1003 in the image displayed in the region 1001 is to be processed in the above-described embodiments and modifications. A partial image outside the range 1003 in the image in the region 1001 is displayed intact in the region 1002, and a result of applying the above-described embodiments and modifications to the partial image within the range 1003 is displayed in the region 1002. Note that even if references are set in any apparatus, the set references are registered in the information processing apparatus 1 (2).

Fourth Embodiment

Figure 5:
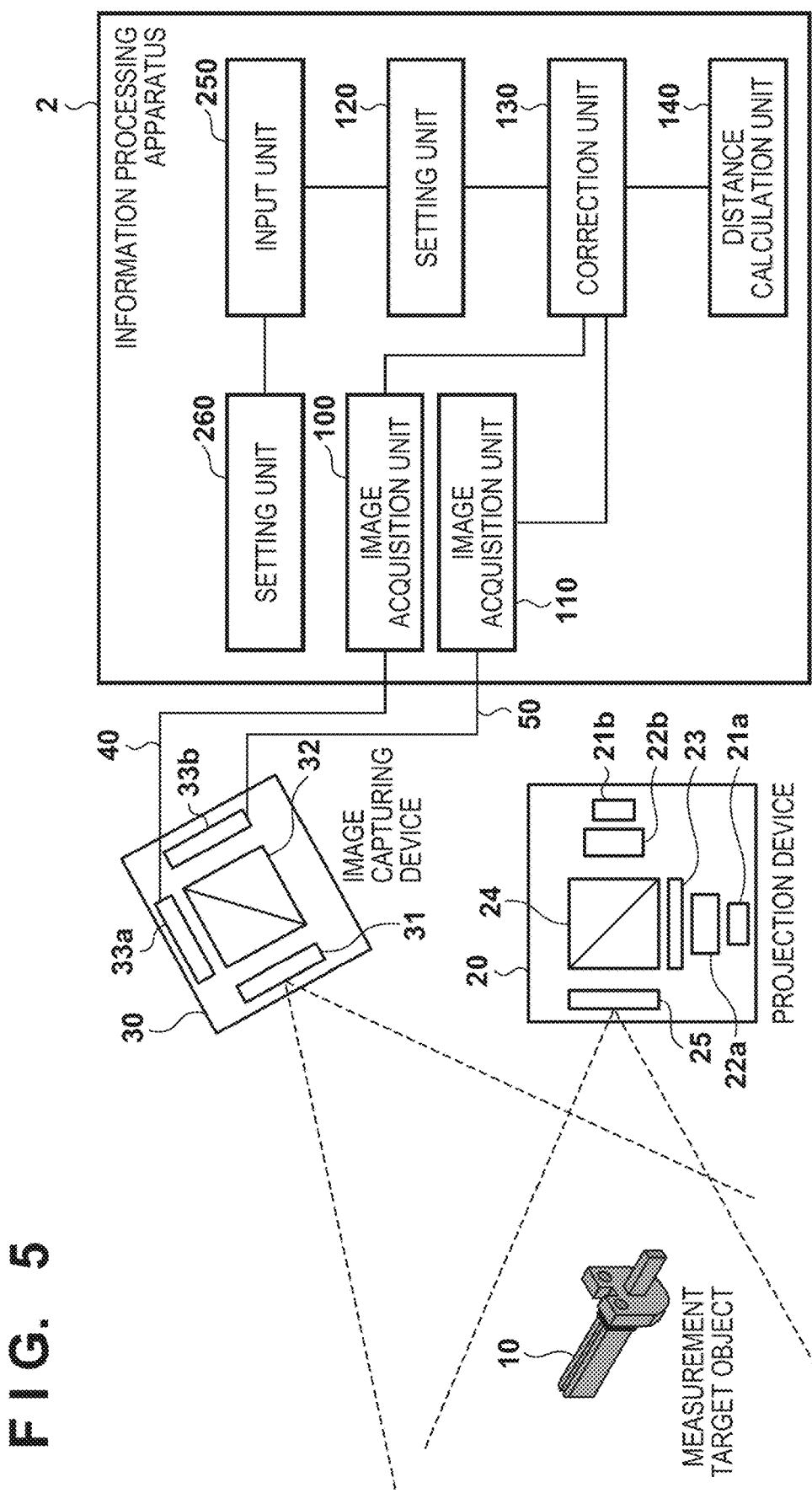
FIG. 5 is a block diagram showing an example of the functional arrangement of a three-dimensional shape measurement system.

The functional units of an information processing apparatus 1 or 2 shown in FIG. 1 or 5 may be implemented by hardware but may also be implemented by software (computer programs). In the latter case, a computer apparatus capable of executing the computer programs is applicable to the information processing apparatus 1 or 2. An example of the hardware arrangement of the computer apparatus applicable to the information processing apparatus 1 or 2 will be described with reference to a block diagram shown in FIG. 11.

A CPU 1101 executes processing using computer programs and data stored in a RAM 1102 and a ROM 1103. With this processing, the CPU 1101 controls the operation of the overall computer apparatus, and executes or controls each processing described above as processing performed by the information processing apparatus 1 or 2.

The RAM 1102 has an area to store computer programs and data loaded from the ROM 1103 or an external storage device 1106 and data externally received via an I/F (interface) 1107. Furthermore, the RAM 1102 has a work area used by the CPU 1101 to execute various processes. The RAM 1102 can appropriately provide various areas. The ROM 1103 stores setting data and computer programs of the computer apparatus, which need not be rewritten.

An operation unit 1104 is formed by a user interface such as a keyboard and a mouse, and can input various instructions to the CPU 1101 when operated by the user.

A display unit 1105 is formed from a CRT or a liquid crystal screen, and displays the processing result of the CPU 1101 as images or characters. For example, the GUI exemplified in FIG. 10 can be displayed on the display unit 1105. The operation unit 1104 and the display unit 1105 may be integrated to form a touch panel screen.

The external storage device 1106 is a mass information storage device represented by a hard disk drive device. The external storage device 1106 saves an OS (Operating System), and the computer programs and data for causing the CPU 1101 to execute or control each processing described as processing executed by the information processing apparatus 1 or 2. The computer programs include computer programs for causing the CPU 1101 to implement the functions of image acquisition units 100 and 110, a setting unit 120, a correction unit 130, a distance calculation unit 140, a setting unit 260 and an input unit 250. The data saved in the external storage device 1106 include those processed as known information in the above description, such as the references. The computer programs and data saved in the external storage device 1106 are appropriately loaded into the RAM 1102 under the control of the CPU 1101 and processed by the CPU 1101.

The I/F 1107 functions as an interface used by the computer apparatus to perform data communication with an external apparatus. For example, the computer apparatus acquires a pattern image 40 and a correction image 50 from an image capturing device 30 via the I/F 1107. The CPU 1101, the RAM 1102, the ROM 1103, the operation unit 1104, the display unit 1105, the external storage device 1106, and the I/F 1107 are all connected to a bus 1108.

Fifth Embodiment

This embodiment will explain an arrangement of projecting pattern light for three-dimensional shape measurement and uniform illumination light for correction image acquisition onto a single measurement target object and changing the degree of unevenness-of-brightness correction based on a variation in brightness in a captured image of the measurement target object onto which the pattern light is projected. In this embodiment, a variation in brightness in the captured image is evaluated as an index representing the magnitude of the unevenness of the brightness of the captured image of the measurement target object onto which the pattern light is projected, and the degree of unevenness-of-brightness correction is increased as a variation in brightness is larger. More specifically, if the variation in brightness is large, the degree of unevenness-of-brightness correction is increased. Conversely, if the variation in brightness is small, the degree of unevenness-of-brightness correction is decreased. With this operation, if the unevenness of the brightness in the captured image of the measurement target object onto which the pattern light is projected is small, the degree of correction for the captured image is corrected to a lower degree, thereby making it possible to perform three-dimensional measurement accurately.

An example of the functional arrangement of a three-dimensional shape measurement system according to this embodiment will be described with reference to a block diagram shown in FIG. 12. The three-dimensional shape measurement system according to this embodiment is obtained by using an information processing apparatus 5 instead of the information processing apparatus 1 of the three-dimensional shape measurement system shown in FIG. 1. The information processing apparatus 5 is obtained by replacing the setting unit 120 and the correction unit 130 of the information processing apparatus 1 by a setting unit 520 and a correction unit 530, respectively. Note that in this embodiment, components denoted by the same reference numerals as in the first embodiment have the same functions as those in the first embodiment and a description thereof will be omitted.

The setting unit 520 sets a degree W of unevenness-of-brightness correction based on a variation in brightness in a pattern image 40. The "variation in brightness in the pattern image 40" is evaluated by the variance of peak brightness in the pattern image 40. More specifically, at the time of three-dimensional shape measurement of a measurement target object 10, measurement pattern light is extracted from the pattern image 40 and the variance of the peak brightness of the extracted measurement pattern light is calculated. The degree W of unevenness-of-brightness correction is set in accordance with the calculated variance of the peak brightness. The maximum and minimum values of the variance for setting the degree W of unevenness-of-brightness correction are registered in advance in the information processing apparatus 5.

In accordance with the degree W of unevenness-of-brightness correction set by the setting unit 520, the correction unit 530 corrects the unevenness of the brightness in the pattern image 40 acquired by an image acquisition unit 100 using a correction image 50 acquired by an image acquisition unit 110, thereby outputting the post-correction pattern image 40 as a distance calculation image.

Figure 13:
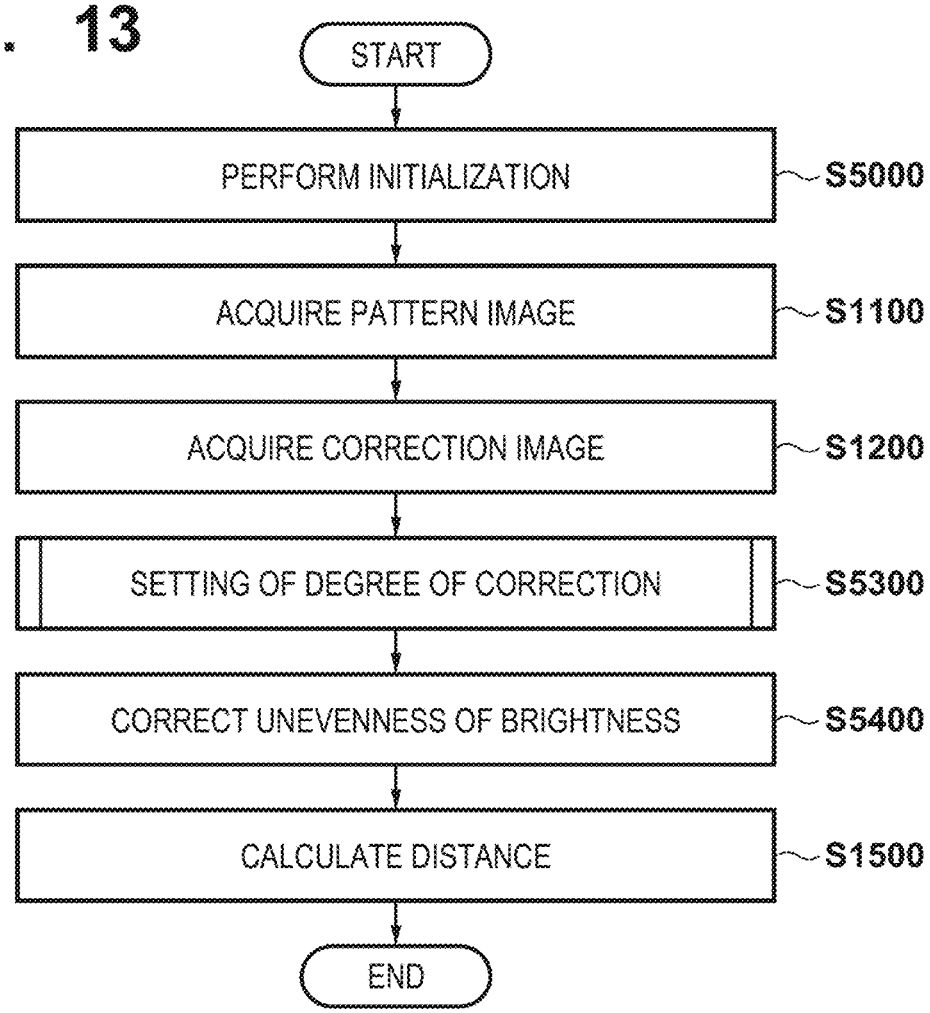
FIG. 13 is a flowchart illustrating the overall processing of three-dimensional shape measurement.

Overall processing performed by the information processing apparatus 5 to measure the three-dimensional shape of the measurement target object 10 will be described with reference to a flowchart shown in FIG. 13. Note that in this embodiment, in steps denoted by the same reference symbols as in the first embodiment, the same processes as those in the first embodiment are performed, and a description thereof will be omitted. In step S5000, the setting unit 520 registers, in the information processing apparatus 5, the maximum and minimum values of the variance for determining the degree W of unevenness-of-brightness correction.

Figure 14:
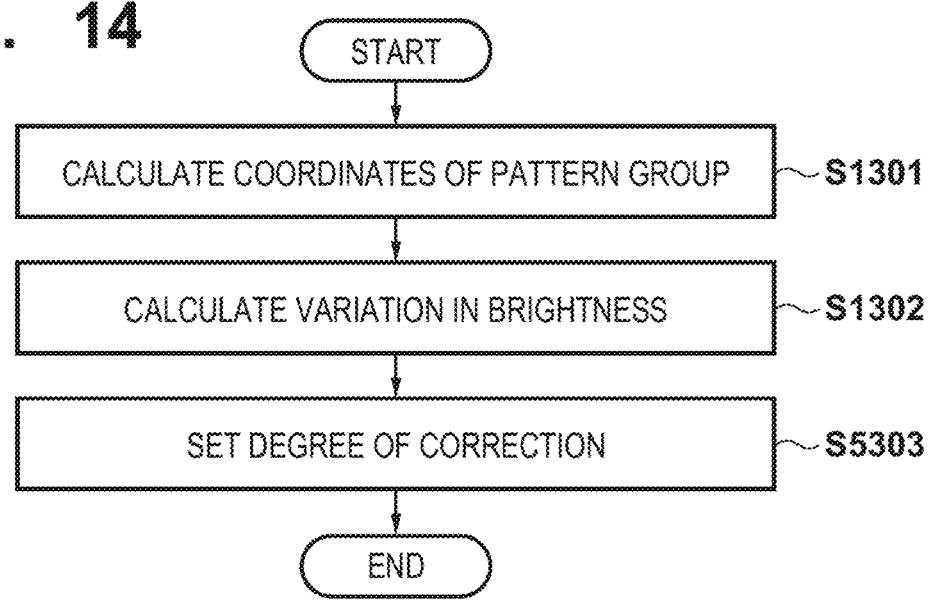
FIG. 14 is a flowchart illustrating details of processing in step S5300.

In step S5300, the setting unit 520 sets the degree W of unevenness-of-brightness correction based on the variance of the peak brightness in the pattern image 40 acquired in step S1100. The processing in step S5300 will be described in detail with reference to FIG. 14.

In step S5303, the setting unit 520 sets the degree W of unevenness-of-brightness correction based on a variance V obtained in step S1302 and the maximum and minimum values of the variance registered in advance in the information processing apparatus 5 in step S5000 in accordance with:

$$W = \frac{V - V_{min}}{V_{max} - V_{min}} \quad (5)$$

wherein W represents the degree of unevenness-of-brightness correction. As W is smaller, the degree of unevenness-of-brightness correction is lower, and as W is larger, the degree of unevenness-of-brightness correction is higher. V represents the variance obtained in step S1302. As V is smaller, the unevenness of the brightness is smaller, and as V is larger, the unevenness of the brightness is larger. Vmax and Vmin respectively represent the maximum and minimum values of the variance registered in the information processing apparatus 5 in step S5000. Vmax and Vmin may be preset by the user. Alternatively, using the measurement target object 10 (or a reference object made of the same material as that of the measurement target object 10), a projection device 20, and an image capturing device 30, Vmax and Vmin may be obtained in advance from an image obtained by capturing the pattern light projected onto the object. Furthermore, using the measurement target object 10 (or a reference object made of the same material as that of the measurement target object 10), the projection device 20, and the image capturing device 30, W may be preset as a table based on an image obtained by capturing the pattern light projected on the object. In either case, the degree W of unevenness-of-brightness correction is set lower if the variance, that is, the unevenness of the brightness is small, and set higher if the variance, that is, the unevenness of the brightness is large.

In step S5400, the correction unit 530 corrects the unevenness of the brightness of the pattern image 40 using the correction image 50 in accordance with the degree W of unevenness-of-brightness correction by equation (6) below, thereby outputting the post-correction pattern image 40 (corrected image) as a distance calculation image.

$$I_{rev}(u,v) = (1-W) \times I_{pat}(u,v) + W \times I_{div}(u,v) \quad (6)$$

where (u, v) represents a pixel position in the image. Furthermore, $I_{pat}(u, v)$, v), and $I_{rev}(u, v)$ respectively represent the brightness value of the pattern image 40 at the pixel position (u, v), the brightness value (equation (1)) of the post-correction pattern image 40 at the pixel position (u, v) when the unevenness-of-brightness correction mode is ON according to the first embodiment, and the brightness value of the pattern image 40 after unevenness-of-brightness correction at the pixel position (u, v) according to this embodiment.

In this embodiment, a variation in pattern peak brightness is calculated from the pattern image 40, and the degree of unevenness-of-brightness correction is changed and set in accordance with the variation. However, the degree of unevenness-of-brightness correction may be set using a variation in brightness in the correction image 50 instead of the variation in pattern peak brightness in the pattern image 40.

In this embodiment, if W is sufficiently close to 0 (smaller than a predetermined threshold) or sufficiently close to 1 (larger than the predetermined threshold), W may be set to 0 or 1.

In this embodiment, W is set smaller if the variance, that is, the unevenness of the brightness is small, and set larger if the variance, that is, the unevenness of the brightness is large. However, assuming that the degree of unevenness-of-brightness correction is set lower if the variance, that is, the unevenness of the brightness is small, and set higher if the variance, that is, the unevenness of the brightness is large, a change in W may be reversed, as a matter of course.

With this processing, if the unevenness of the brightness in the captured image of the measurement target object onto which the pattern light is projected is small, the degree of correction for the captured image is corrected to a lower degree, thereby making it possible to perform three-dimensional measurement accurately.

Figure 11:
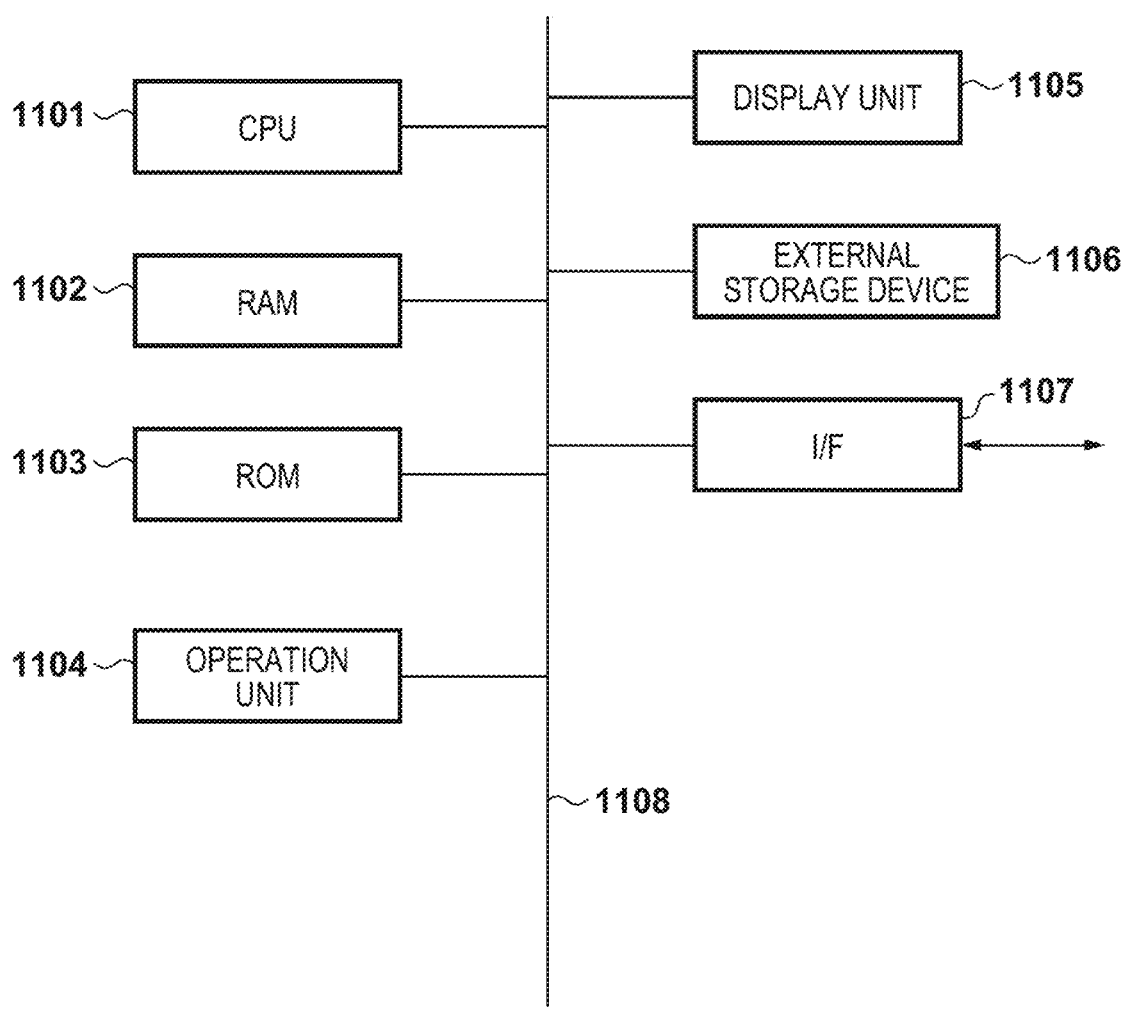
FIG. 11 is a block diagram showing an example of the hardware arrangement of a computer apparatus.
Figure 12:
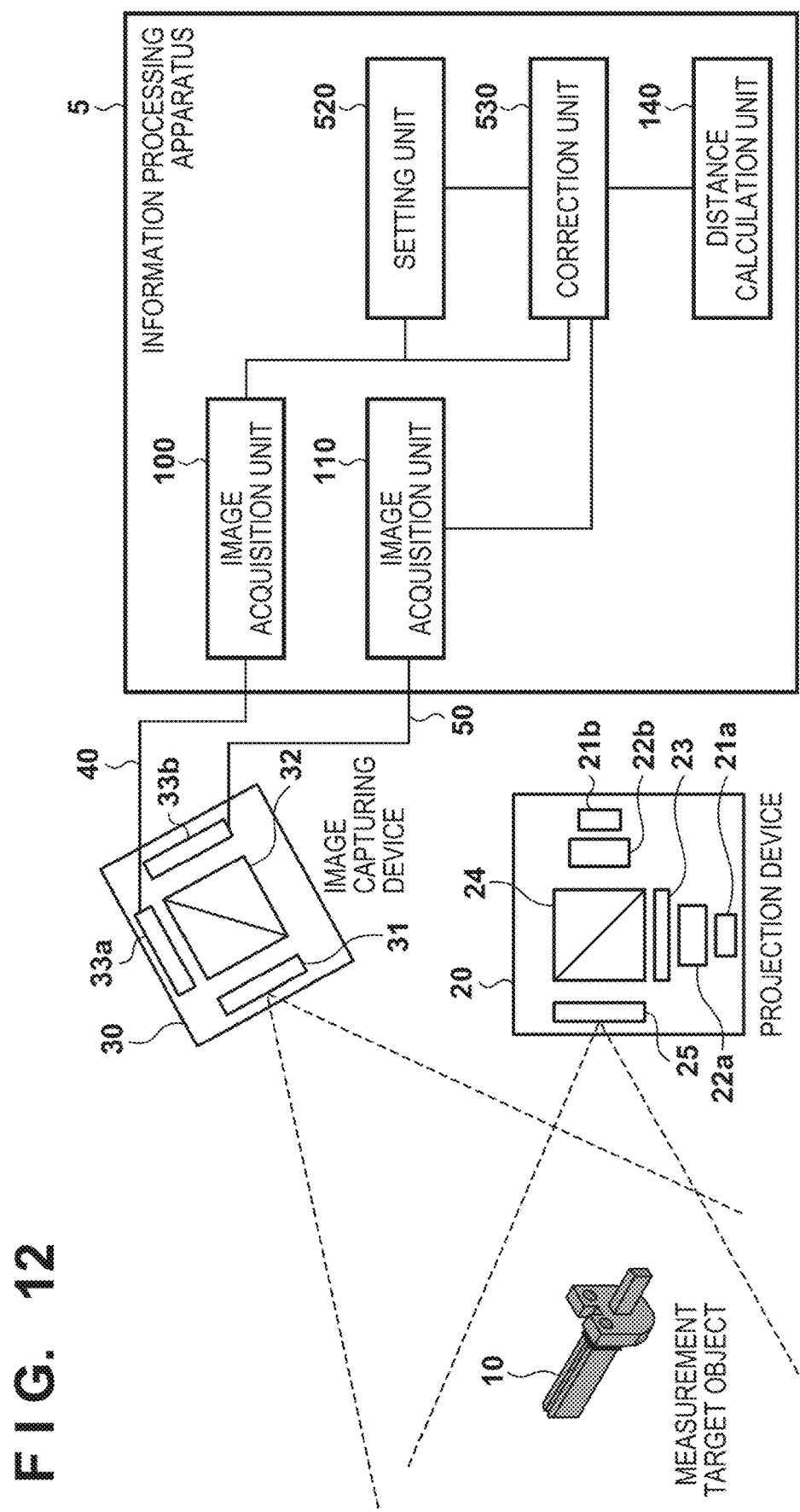
FIG. 12 is a block diagram showing an example of the functional arrangement of a three-dimensional shape measurement system.

Note that, the functional units of the information processing apparatus 5 shown in FIG. 12 may be implemented by hardware but may also be implemented by software (computer programs). In the latter case, a computer apparatus capable of executing the computer programs is applicable to the information processing apparatus 5. As described in the fourth embodiment, the computer apparatus of FIG. 11 is applicable to the information processing apparatus 1 or 2. The computer apparatus of FIG. 11 is also applicable to the information processing apparatus 5.

Furthermore, some or all of the above-described embodiments and modifications may be appropriately combined or selectively used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-097514, filed May 16, 2017, and Japanese Patent Application No. 2018-080820, filed Apr. 19, 2018, which are hereby incorporated by reference herein in their entirety.

What is claimed is:

1. An information processing apparatus comprising:
one or more processors; and
at least one memory storing executable instructions which, when executed by the one or more processors, cause the information processing apparatus to:
determine whether a variance of peak brightness in a first image obtained by capturing an object onto which pattern light for three-dimensional shape measurement is projected is not less than a threshold; and
measure a three-dimensional shape of the object using, in a case where the variance of the peak brightness in the first image is determined to be equal to or greater than the threshold, a corrected image obtained by correcting the first image based on a second image obtained by capturing the object onto which a light different from the pattern light for three-dimensional shape measurement is projected, and using, in a case where the variance of the peak brightness in the first image is determined to be less than the threshold, the first image.

2. The apparatus according to claim 1, wherein in a case where the variance of the peak brightness in the first image is determined to be equal to or greater than the threshold, the determination unit determines to correct unevenness of the brightness in the first image based on the second image.

3. The apparatus according to claim 1, wherein in a case where a variance of a brightness gradient in the first image is not smaller than a threshold, the determination unit determines to correct unevenness of the brightness of the first image.

4. The apparatus according to claim 1, wherein in a case where the variance of the peak brightness of a region of the object in the first image is determined to be equal to or greater than the threshold, the determination determines to correct unevenness of brightness of the region of the object in the first image based on the second image.

5. The apparatus according to claim 1, wherein
the determination determines whether to correct unevenness of brightness of a surface of the object in the first image in accordance with a direction of the surface, and
in a case where the determination determines to perform correction, the measurement measures the object using the corrected image obtained by correcting the unevenness of the brightness of the surface of the object in the first image based on the second image.

6. The apparatus according to claim 1, wherein
the determination determines whether to correct unevenness of brightness of a surface of the object in the first image in accordance with a direction of the surface and a reflection intensity of the surface, and
in a case where the determination unit determines to perform correction, the measurement measures the object using the corrected image obtained by correcting the unevenness of the brightness of the surface of the object in the first image based on the second image.

7. The apparatus according to claim 1, wherein
the determination determines whether to correct unevenness of brightness of a surface of the object in the first image in accordance with a characteristic of the surface, and
in a case where the determination determines to perform correction, the measurement measures the object using the corrected image obtained by correcting the unevenness of the brightness of the surface of the object in the first image based on the second image.

8. The apparatus according to claim 1, wherein the second image is an image of the object irradiated with uniform illumination light.

9. The apparatus according to claim 1, wherein the second image is an image of the object illuminated with environmental light.

10. An information processing method comprising:
determining whether a variance of peak brightness in a first image obtained by capturing an object onto which pattern light for three-dimensional shape measurement is projected is not less than a threshold; and
measuring a three-dimensional shape of the object using, in a case where the variance of the peak brightness in the first image is determined to be equal to or greater than the threshold, a corrected image obtained by correcting the first image based on a second image obtained by capturing the object onto which a light different from the pattern light for three-dimensional shape measurement is projected, and using, in a case where the variance of the peak brightness in the first image is determined to be less than the threshold, the first image.

11. A non-transitory computer-readable storage medium storing a computer program for causing a computer to function as:
a determination unit configured to determine whether a variance of peak brightness in a first image obtained by capturing an object onto which pattern light for three-dimensional shape measurement is projected is not less than a threshold; and
a measurement unit configured to measure a three-dimensional shape of the object using, in a case where the variance of the peak brightness in the first image is determined to be equal to or greater than the threshold, a corrected image obtained by correcting the first image based on a second image obtained by capturing the object onto which a light different from the pattern light for three-dimensional shape measurement is projected, and using, in a case where the variance of the peak brightness in the first image is determined to be less than the threshold, the first image.

12. An information processing apparatus comprising:
one or more processors; and
at least one memory storing executable instructions which, when executed by the one or more processors, cause the information processing apparatus to:
set, based on a variance of peak brightness in a first image of an object onto which pattern light for three-dimensional shape measurement is projected, a degree of correction of unevenness of brightness in the first image; and
measure a three-dimensional shape of the object using a corrected image obtained by correcting the unevenness of the brightness of the first image based on the set degree of the correction of the unevenness of the brightness in the first image and a second image obtained by capturing the object onto which the pattern light for three-dimensional shape measurement is not projected.

* * * * *